March 5, 1929. R. L. REDPATH ET AL 1,704,342
MOLDING MACHINE OR APPARATUS
Original Filed Jan. 30, 1924  16 Sheets-Sheet 3
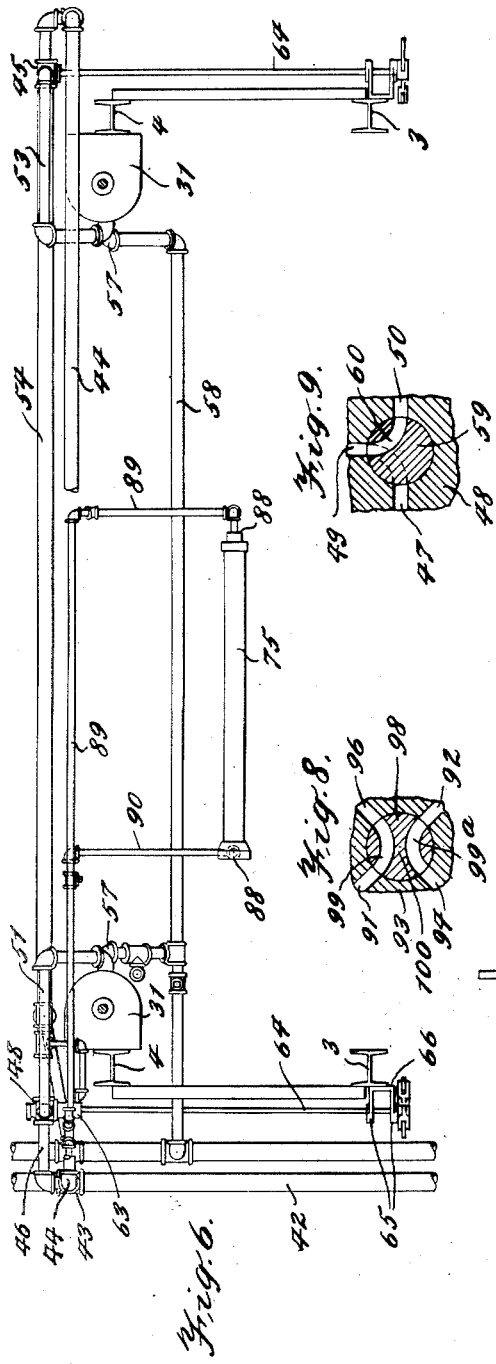

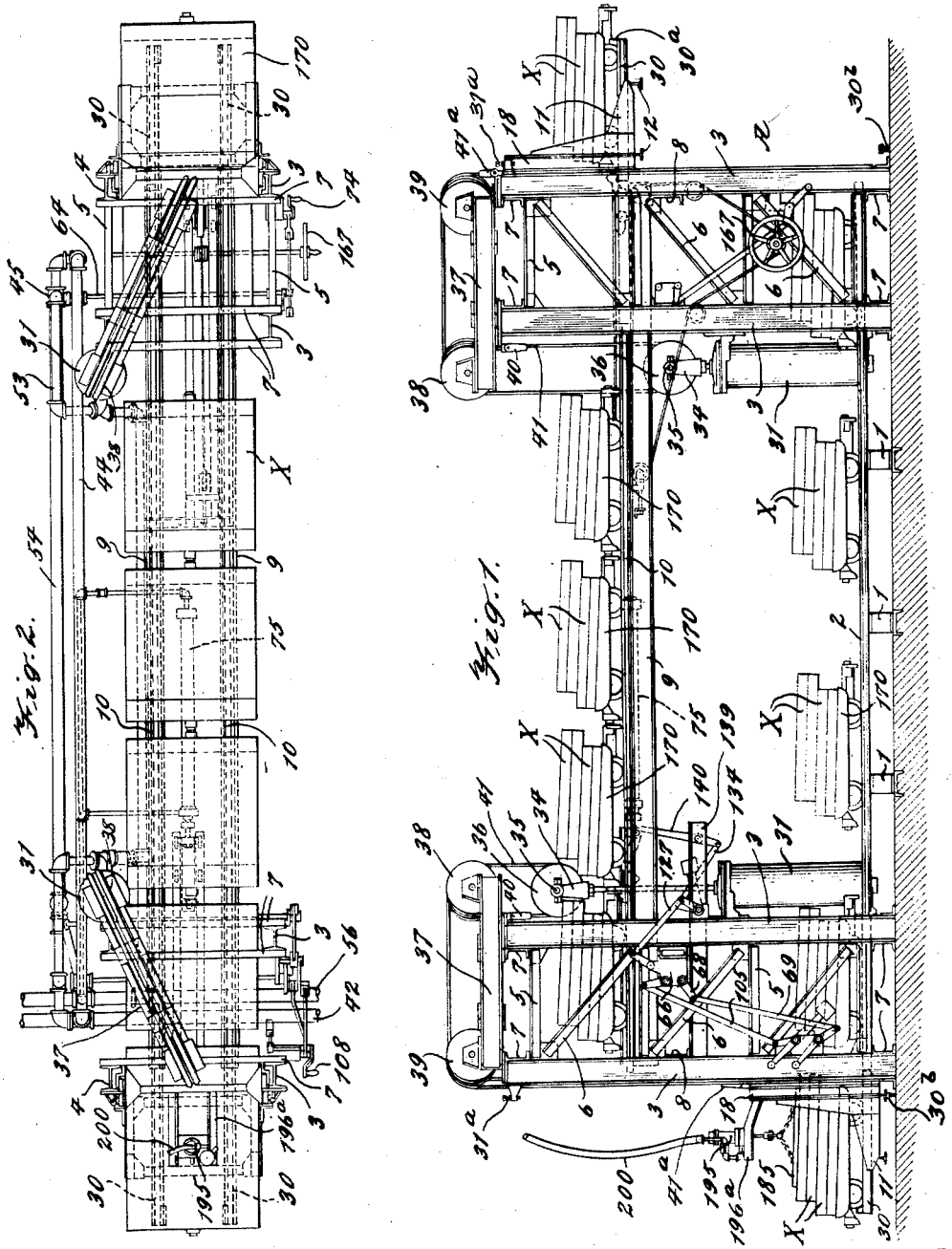

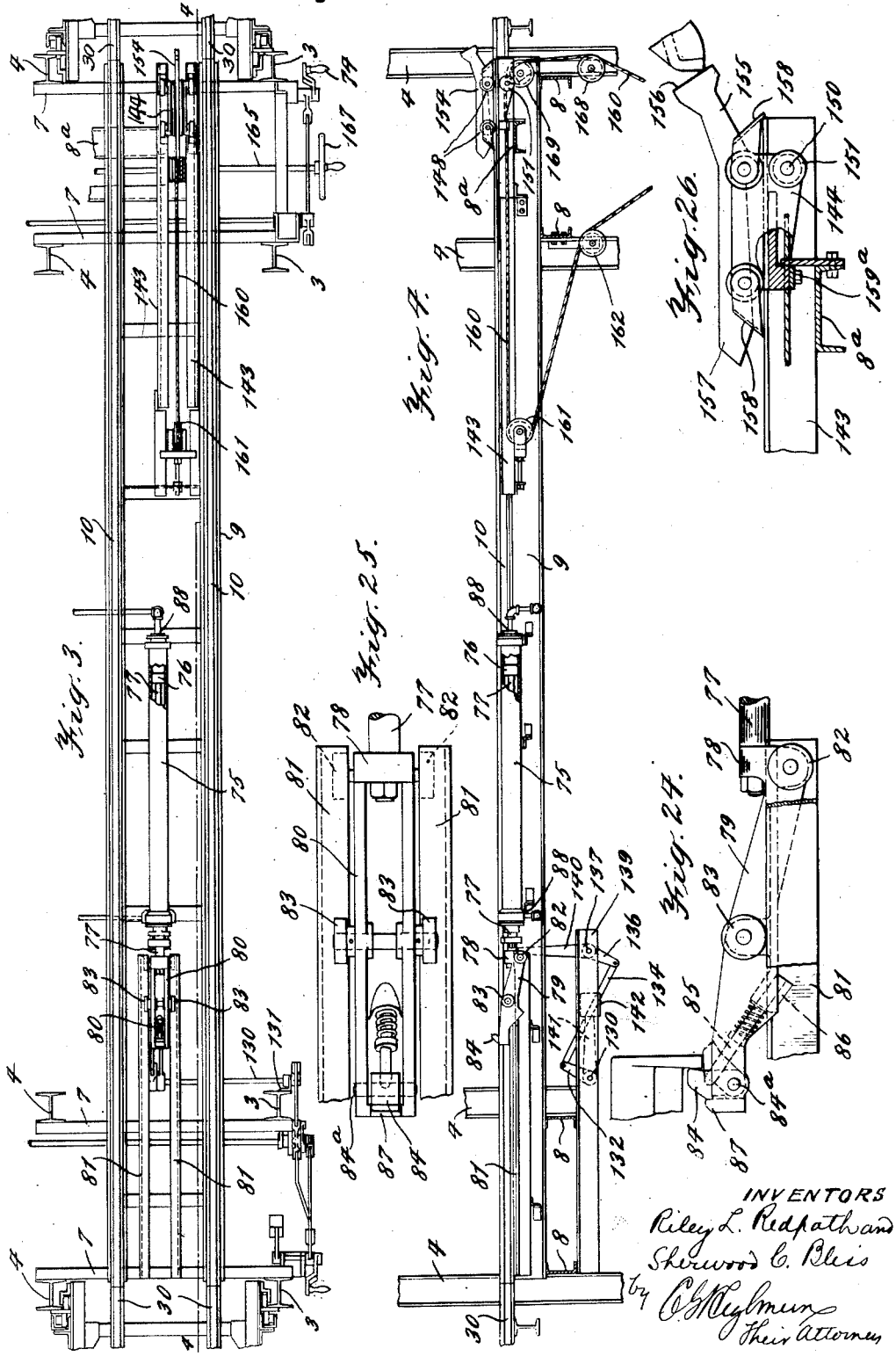

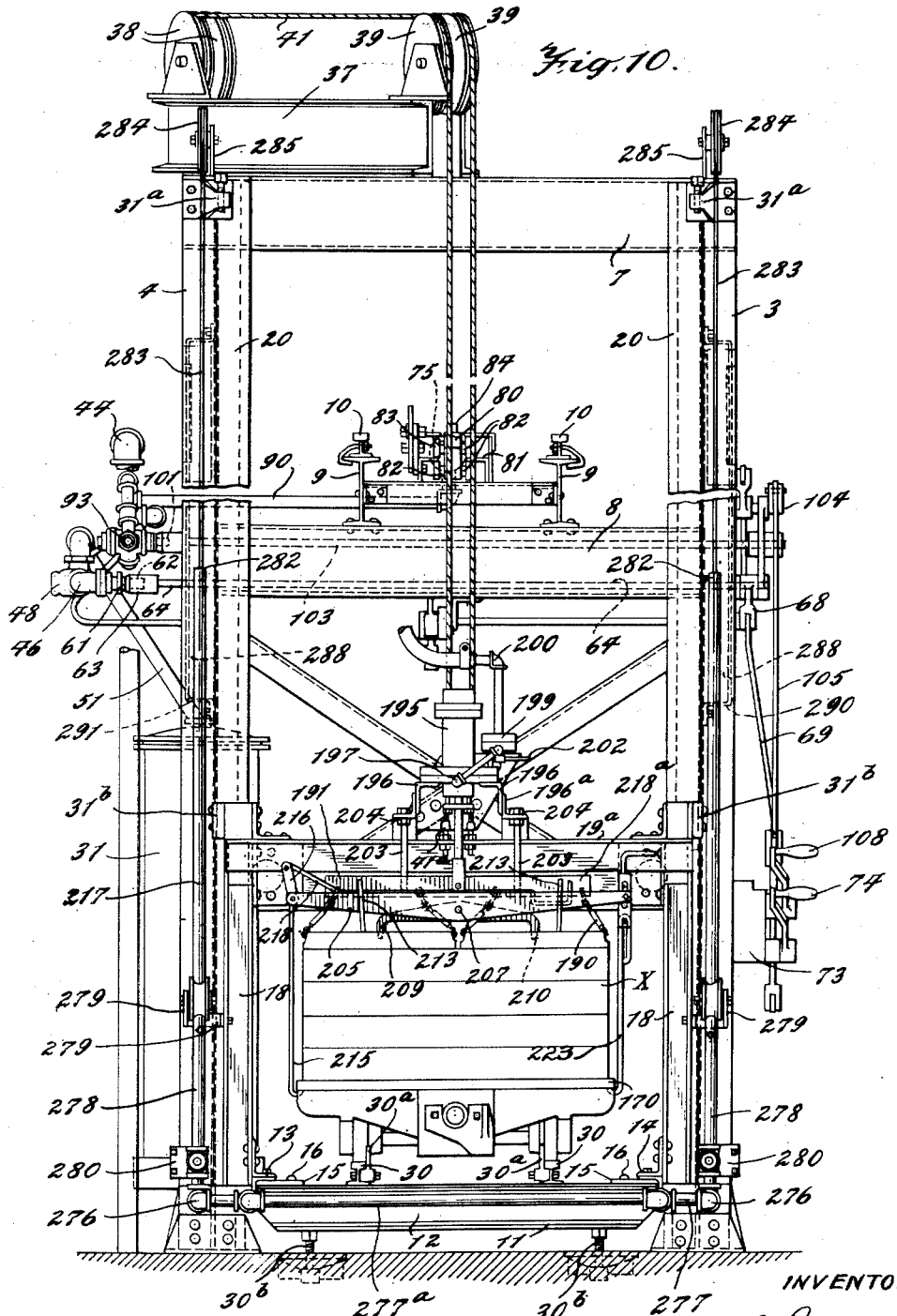

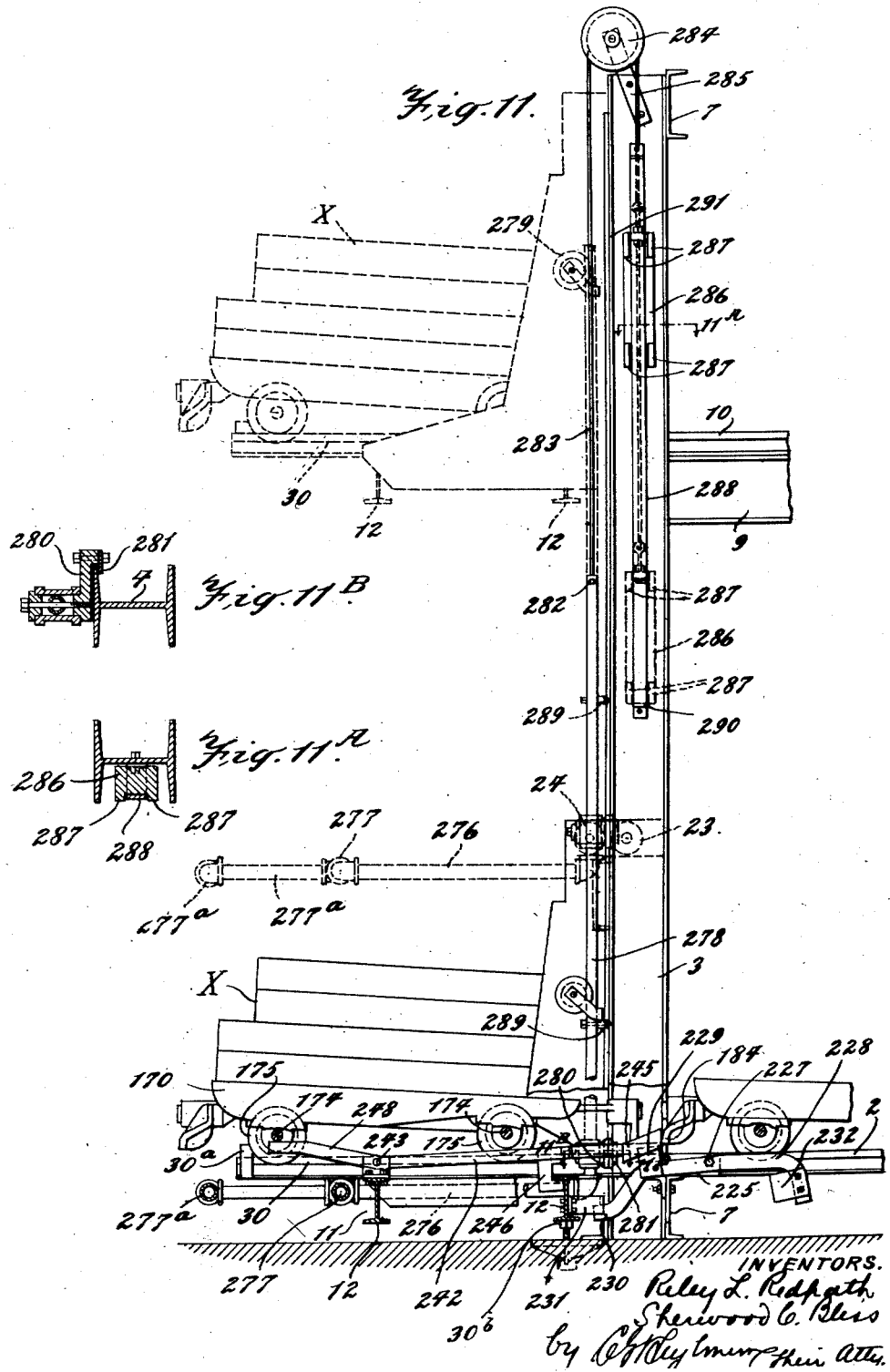

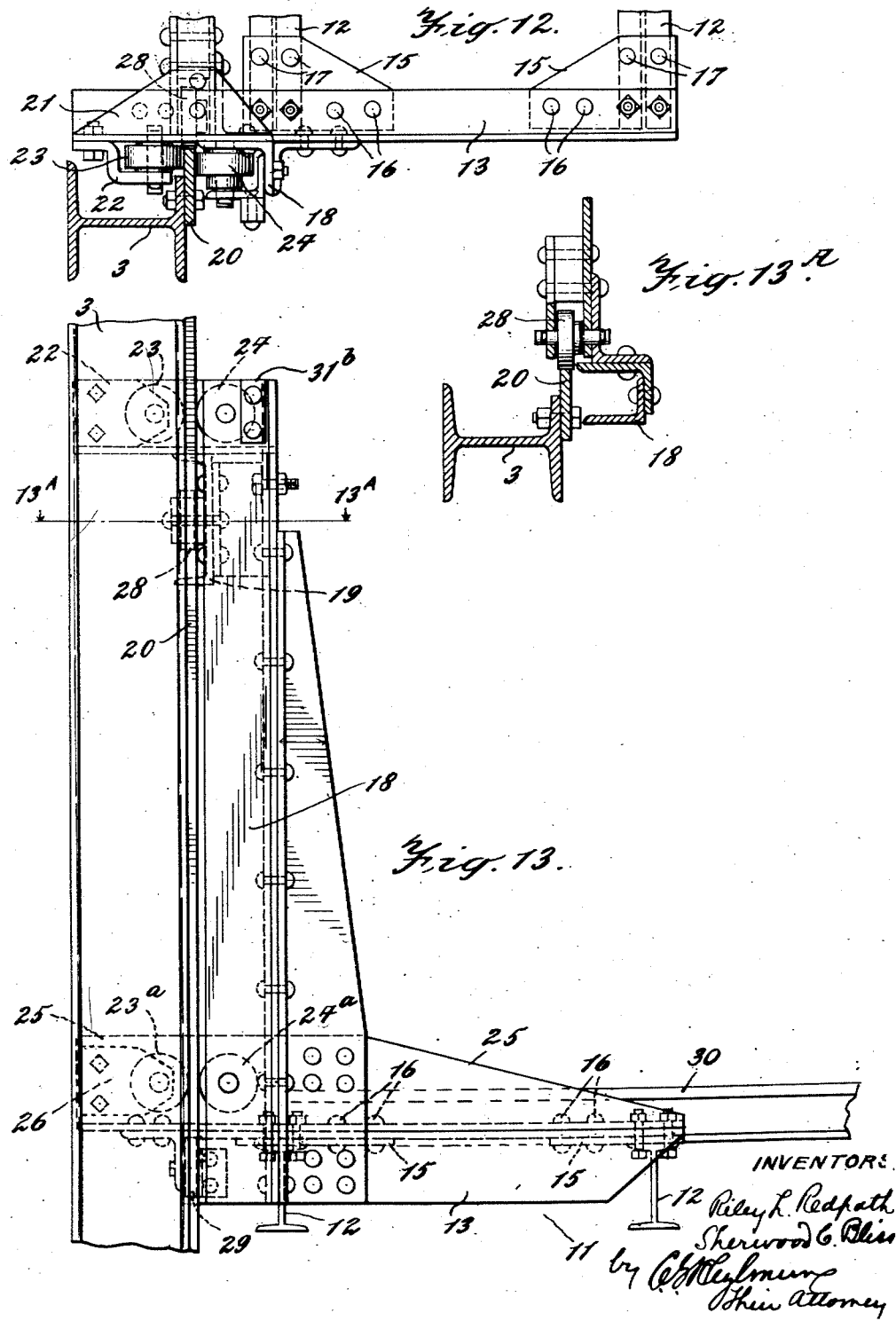

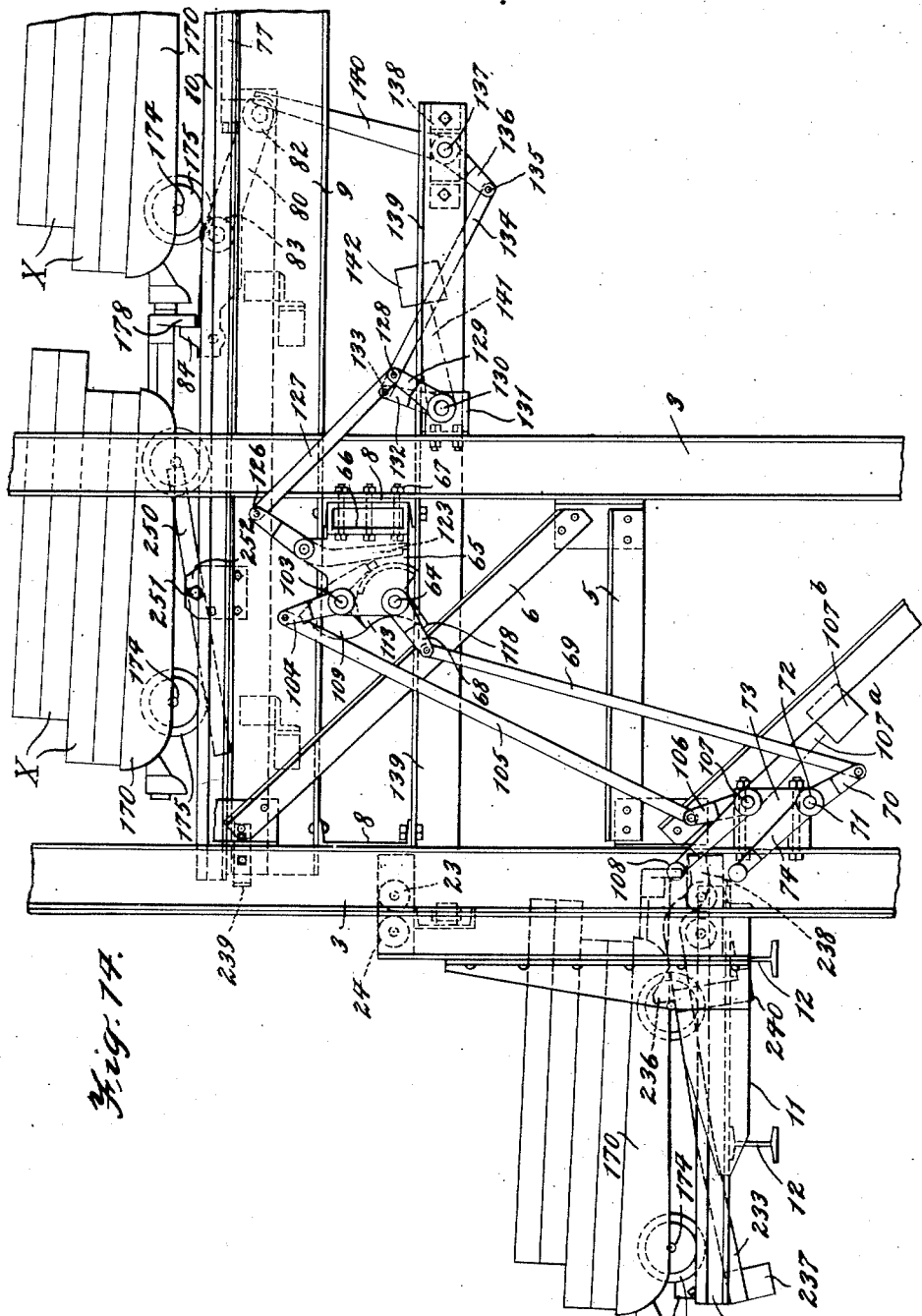

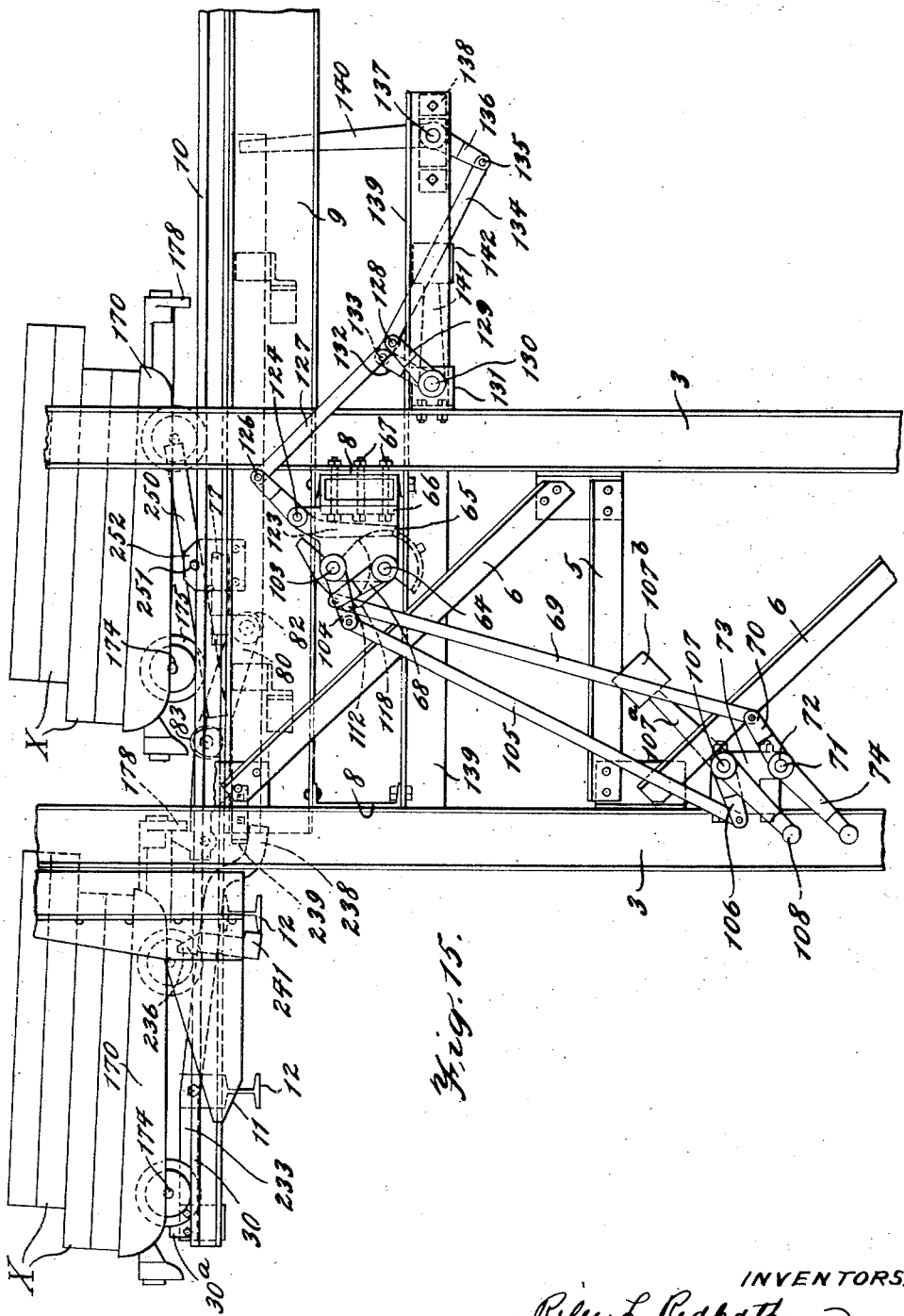

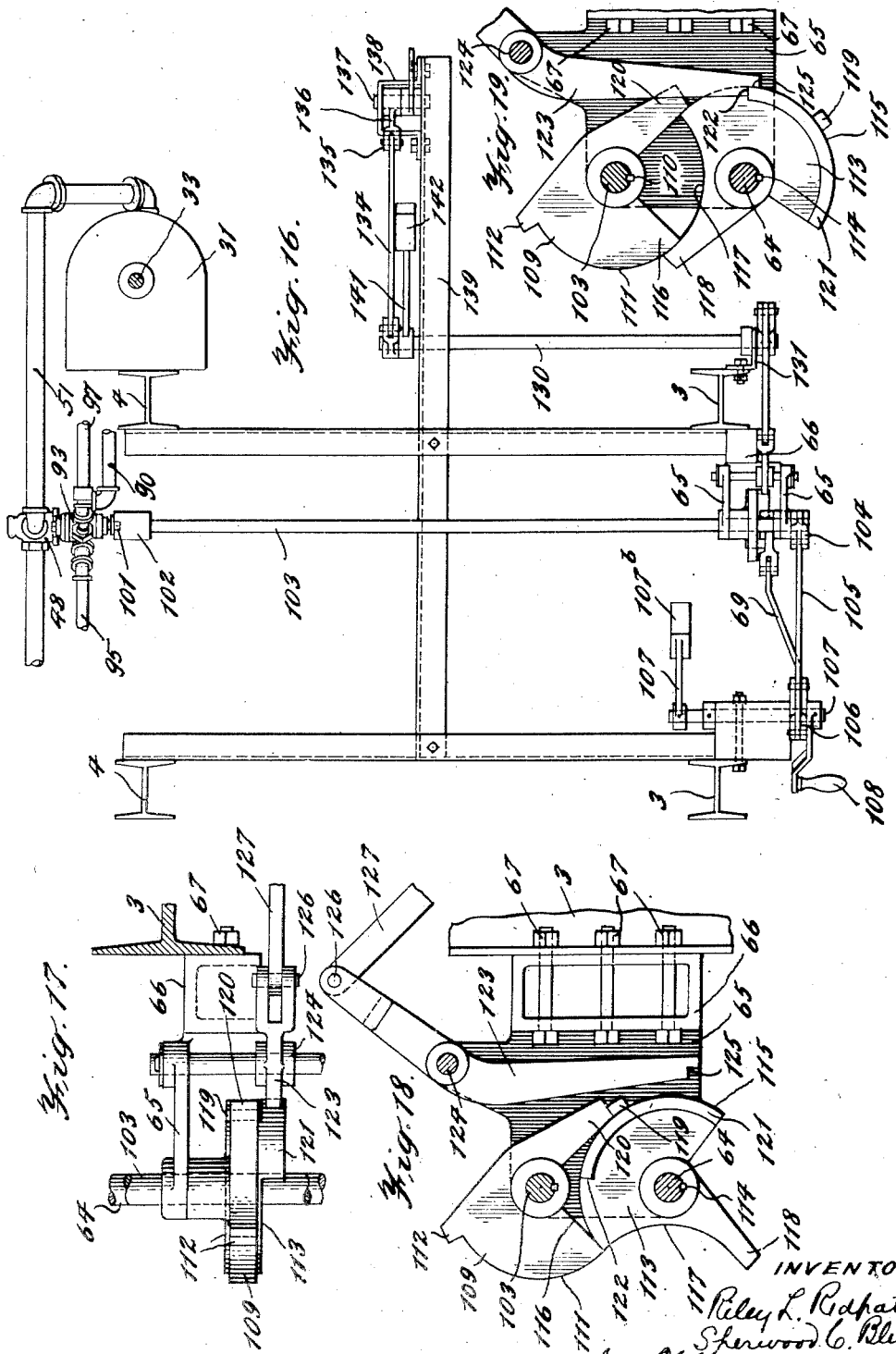

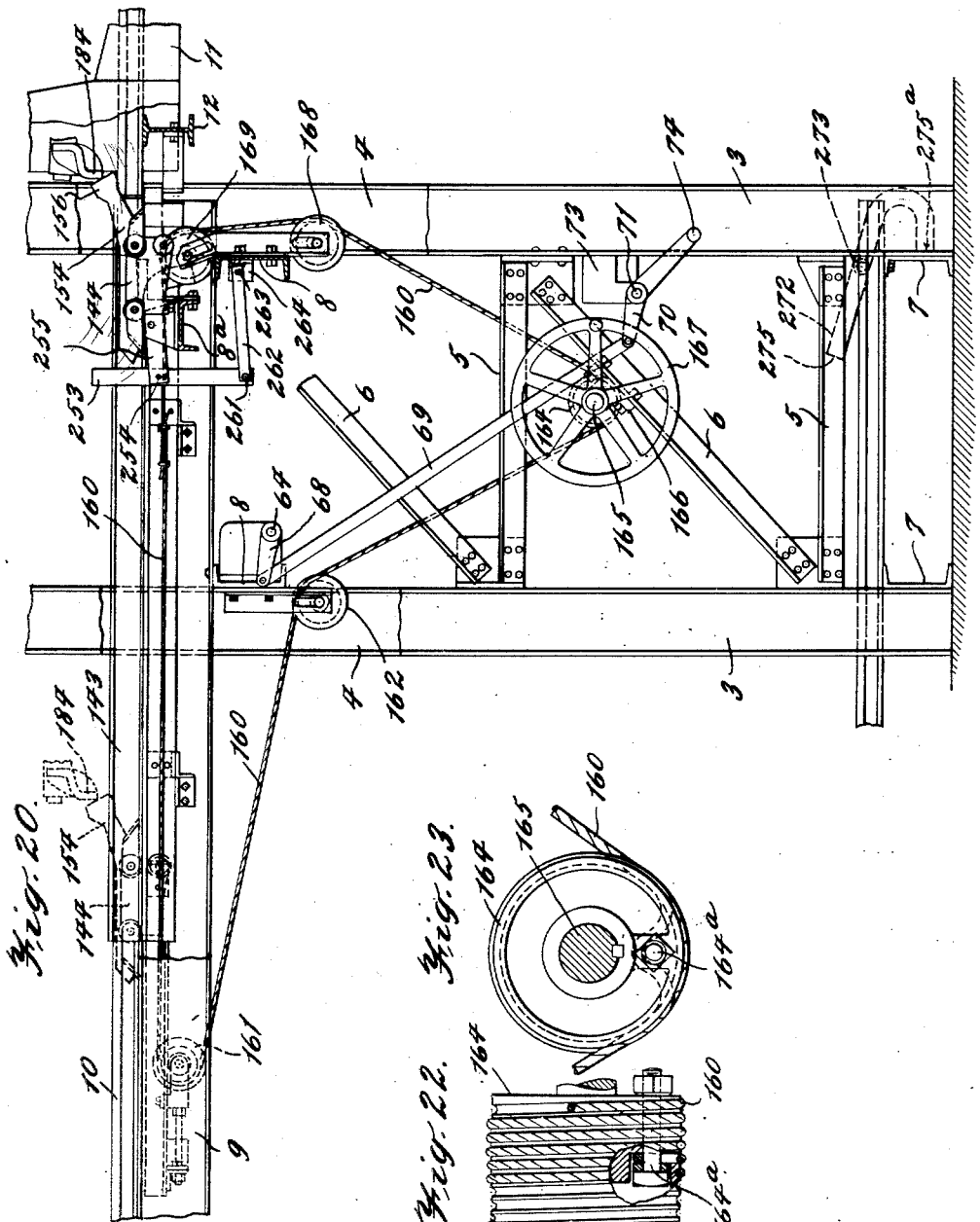

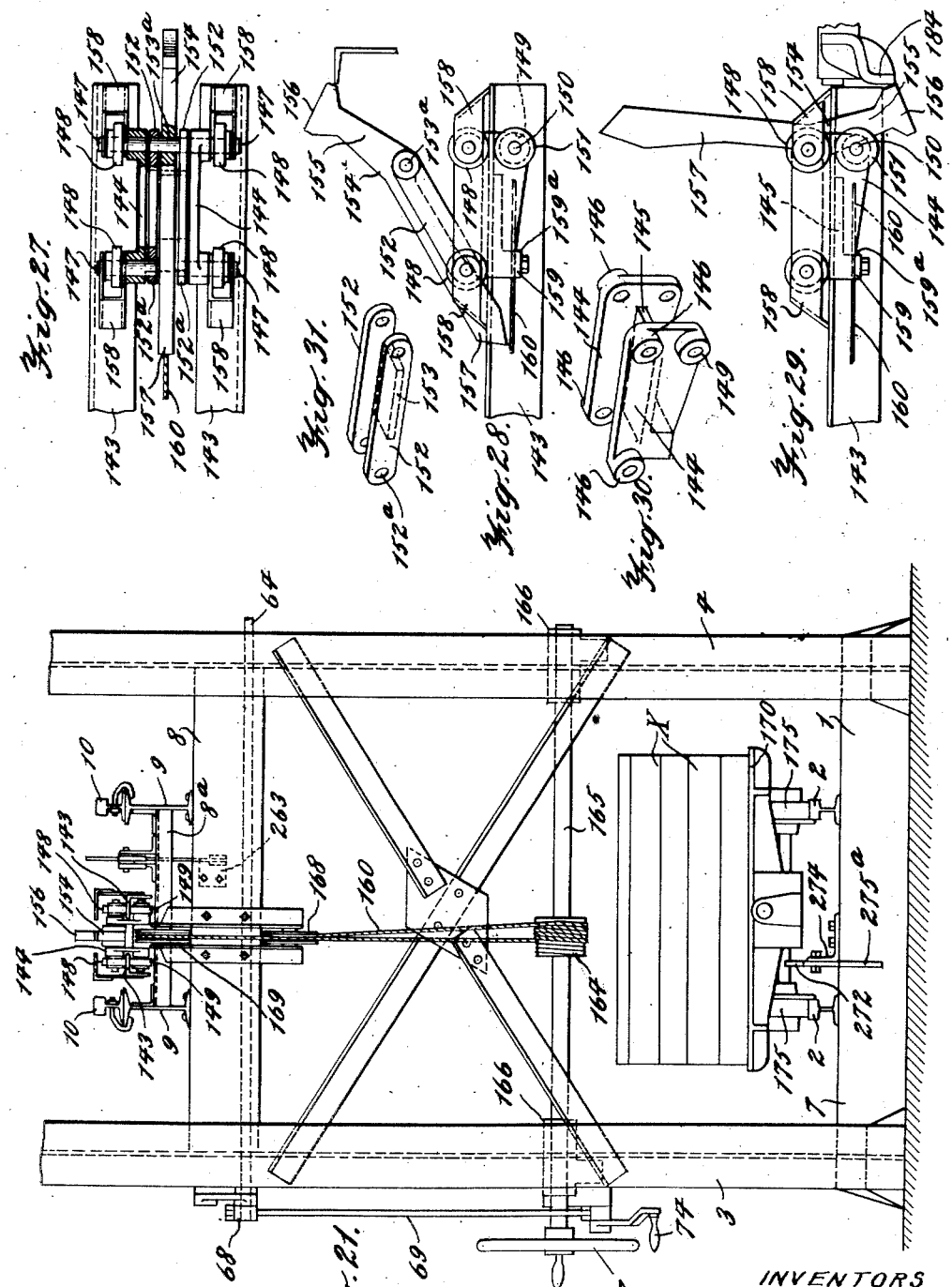

March 5, 1929.  R. L. REDPATH ET AL  1,704,342
MOLDING MACHINE OR APPARATUS
Original Filed Jan. 30, 1924   16 Sheets-Sheet 12
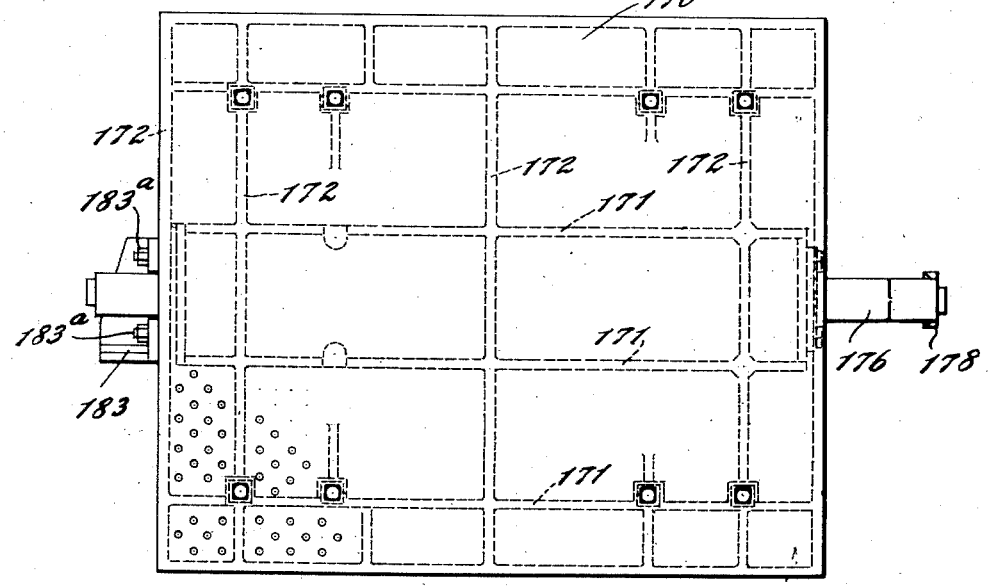
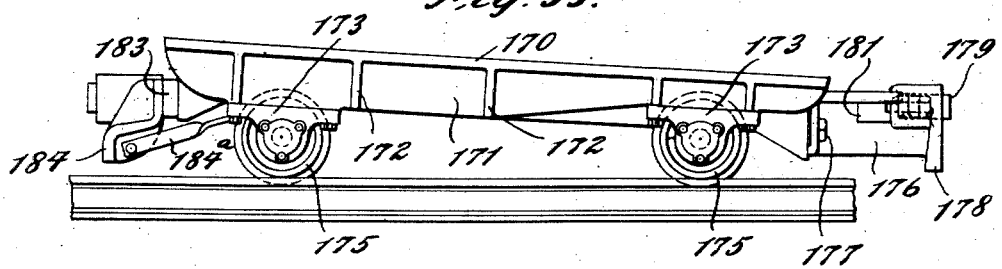
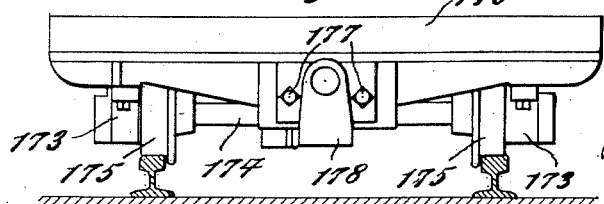
INVENTORS.
Riley L. Redpath
Sherwood C. Bliss
by
Their Attorney March 5, 1929.  R. L. REDPATH ET AL  1,704,342
MOLDING MACHINE OR APPARATUS
Original Filed Jan. 30, 1924   16 Sheets—Sheet 13
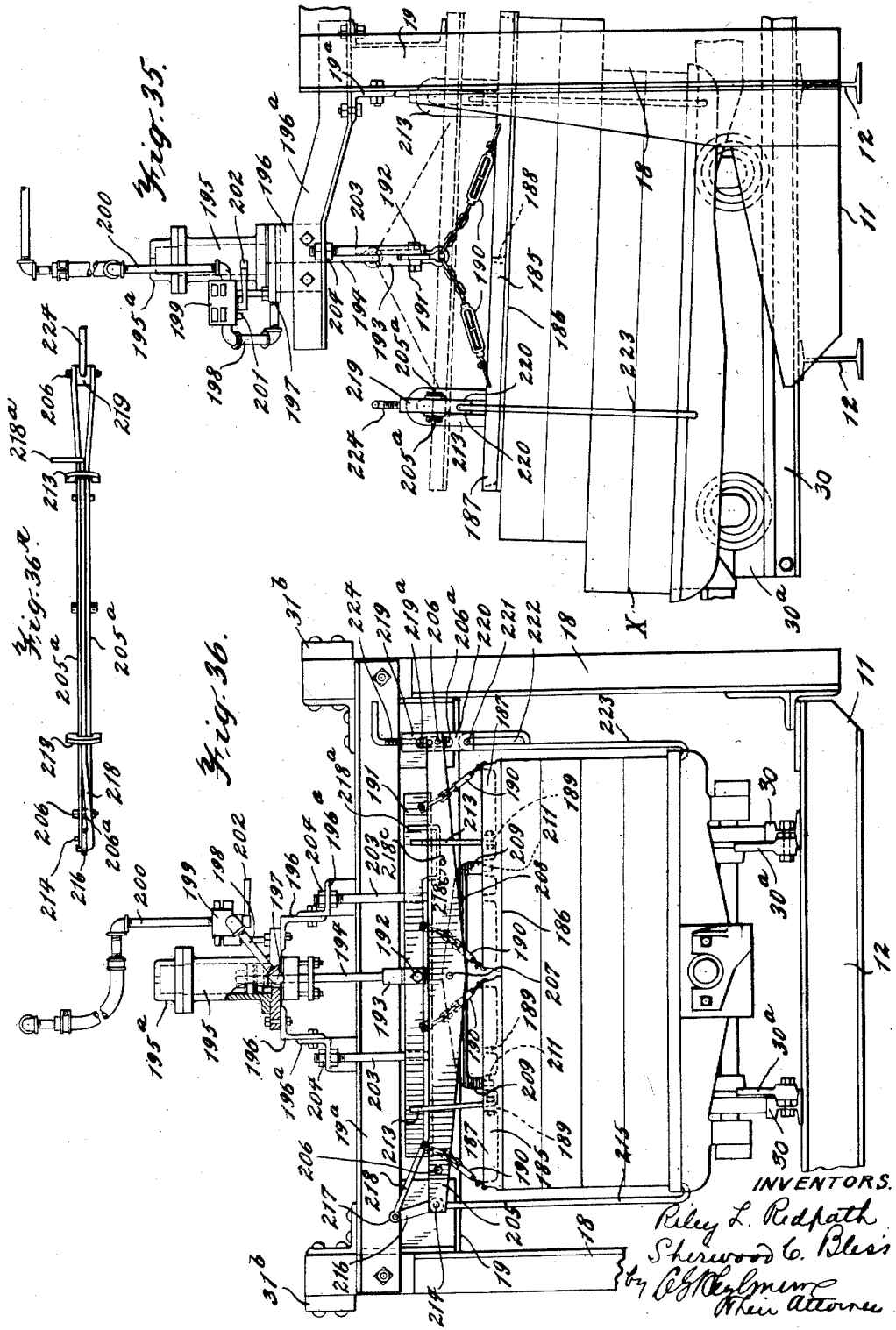
INVENTORS.
Riley L. Redpath
Sherwood C. Bless
By their Attorney

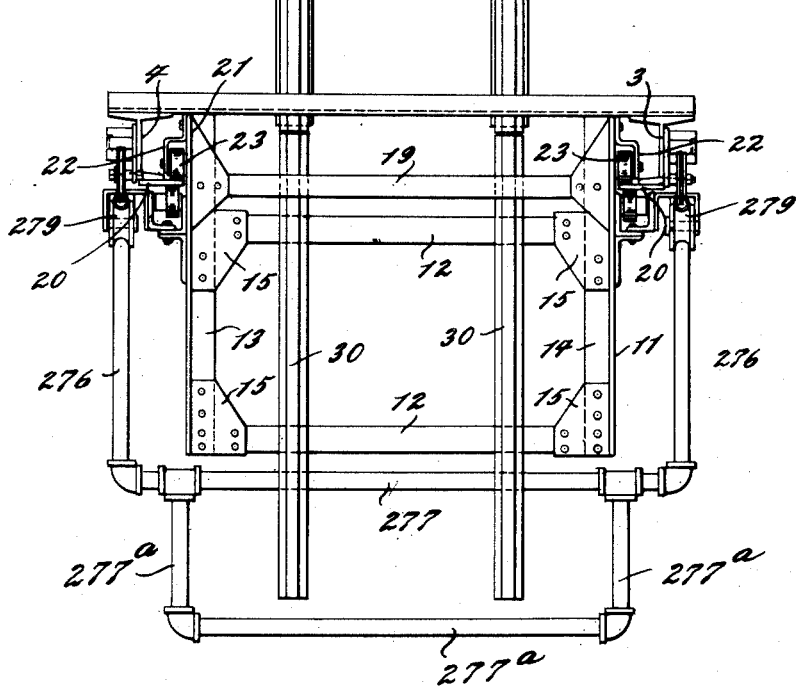
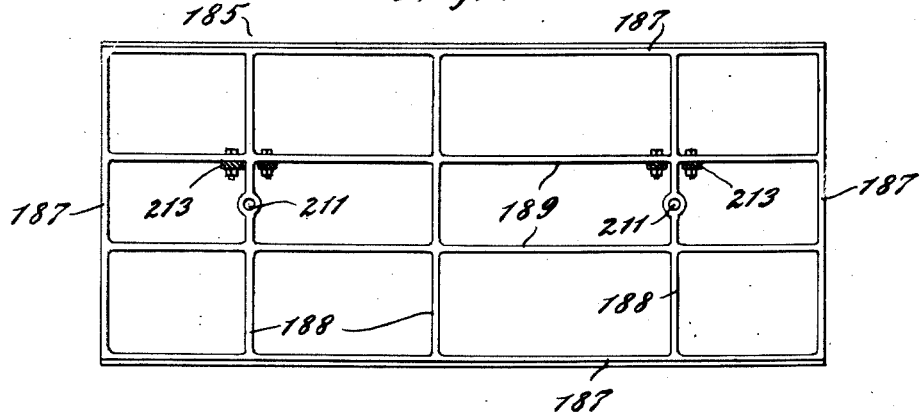

March 5, 1929.  R. L. REDPATH ET AL  1,704,342
MOLDING MACHINE OR APPARATUS
Original Filed Jan. 30, 1924   16 Sheets-Sheet 15

INVENTORS
Riley L. Redpath
Sherwood C. Bliss
by C. H. Heylman
Their Attorney

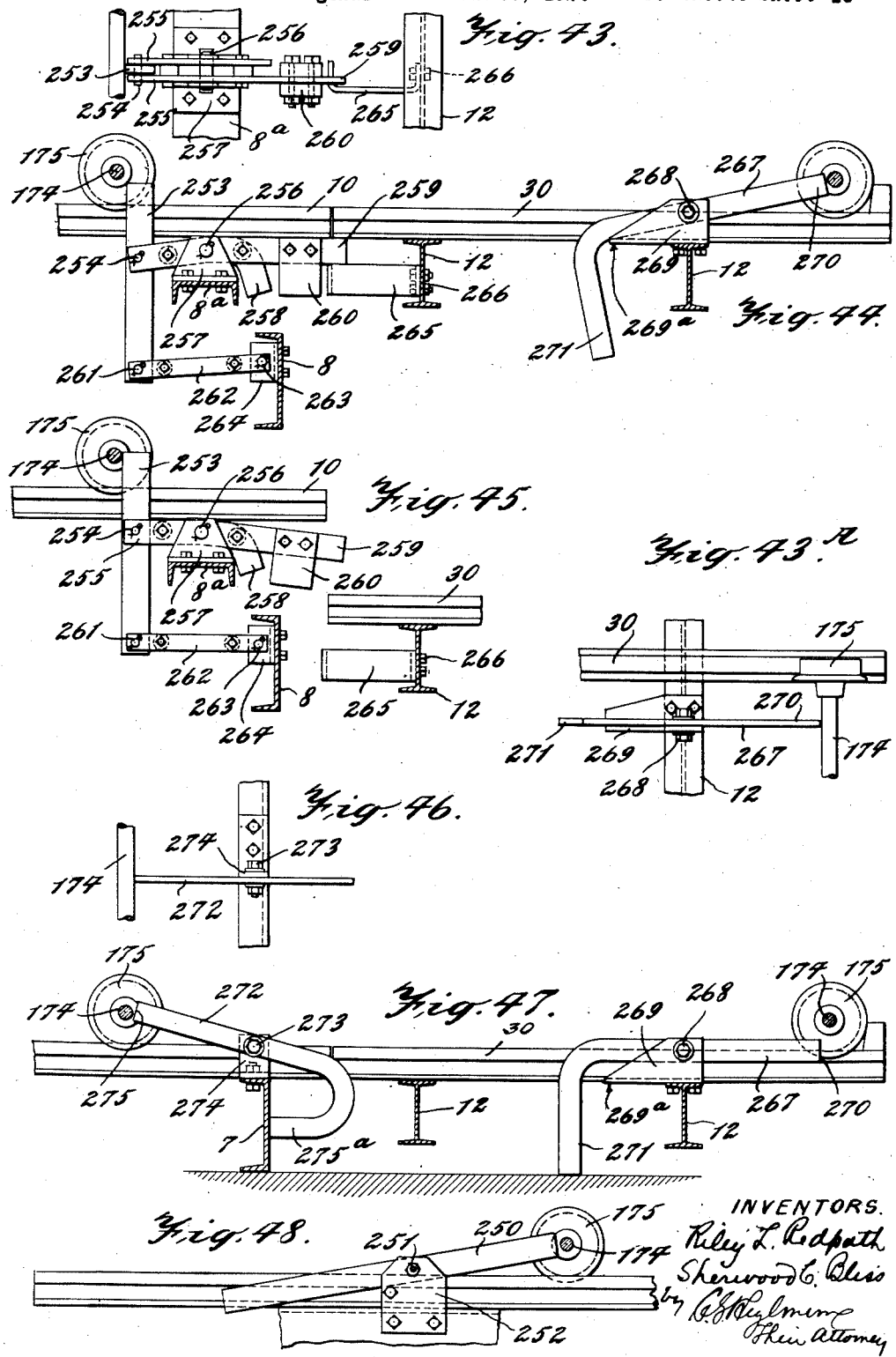

Patented Mar. 5, 1929.

1,704,342

UNITED STATES PATENT OFFICE.

RILEY L. REDPATH, OF BUFFALO, AND SHERWOOD C. BLISS, OF KENMORE, NEW YORK, ASSIGNORS TO AMERICAN RADIATOR COMPANY, OF NEW YORK, N. Y., A CORPORATION OF NEW JERSEY.

MOLDING MACHINE OR APPARATUS.

Application filed January 30, 1924, Serial No. 689,400. Renewed July 26, 1928.

Our invention relates to new and useful improvements in molding machines or apparatus, and more particularly of that character or type adapted for the handling or transportation of molds and the like during various operations attending the casting of metal objects.

The invention consists in the construction and combinations to be more fully described hereinafter, and the novelty of which will be particularly pointed out and distinctly claimed.

In the accompanying drawings to be taken as a part of this specification, we have fully and clearly illustrated a preferred embodiment of our invention, and wherein—

Figure 1 is a view in side elevation of a machine embodying our invention, certain piping shown elsewhere being omitted for the sake of clearness;

Fig. 2 is a top plan view of the construction shown in Fig. 1 and also showing certain parts of the piping omitted therefrom;

Fig. 3 is a top plan view of an upper runway or track forming part of the machine, and showing the means associated therewith for propelling or moving mold carriers or trucks along the same, certain parts being omitted for the sake of clearness;

Fig. 4 is a section on the line 4—4 of Fig. 3;

Fig. 5 is a view in side elevation showing certain power cylinders illustrated in Figs. 1 and 2, and a piping system for controlling the flow of motive agent to and from said cylinders, other parts being omtited for the sake of clearness;

Fig. 6 is a top plan view of the structure shown in Fig. 5;

Fig. 7 is an end view looking from the left of Figs. 5 and 6;

Fig. 8 is an enlarged detail sectional view of a portion of a controlling valve employed in connection with the piping system shown in Figs. 5, 6 and 7 for controlling the truck-moving means shown at the left of Figs. 3 and 4;

Fig. 9 is an enlarged sectional view of a portion of a control valve for controlling the hoisting cylinders shown in Fig. 5;

Fig. 10 is an enlarged view in end elevation looking from the left of Figs. 1 and 2;

Fig. 11 is an enlarged view in side elevation of the left-hand portion of the structure shown in Figs. 1 and 2, and in end elevation in Fig. 10;

Figure 38:
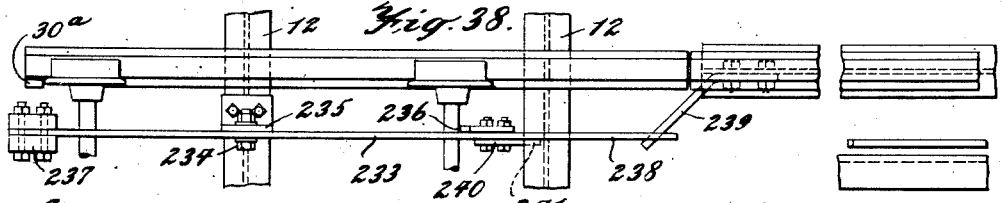
Figure 39:
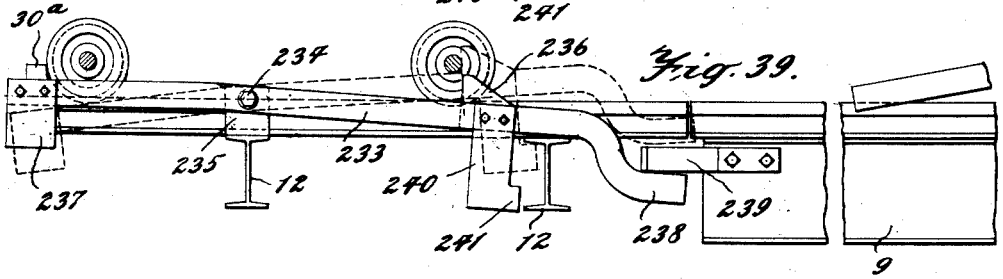
Figure 40:
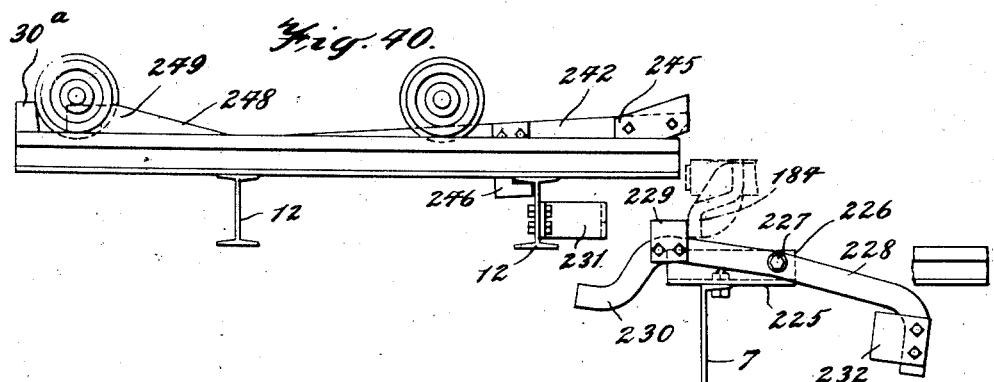
Figure 41:
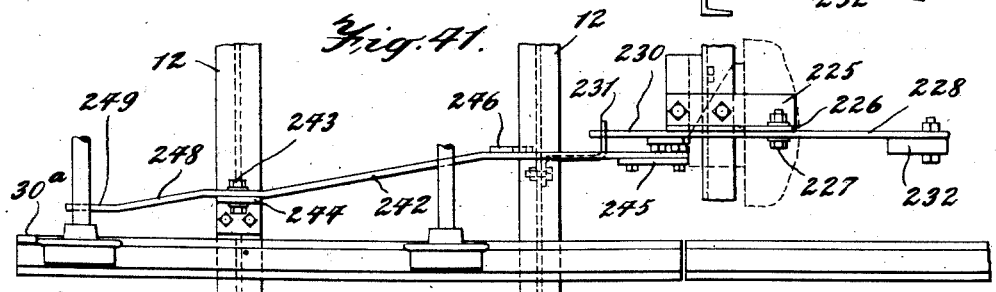
Figure 42:
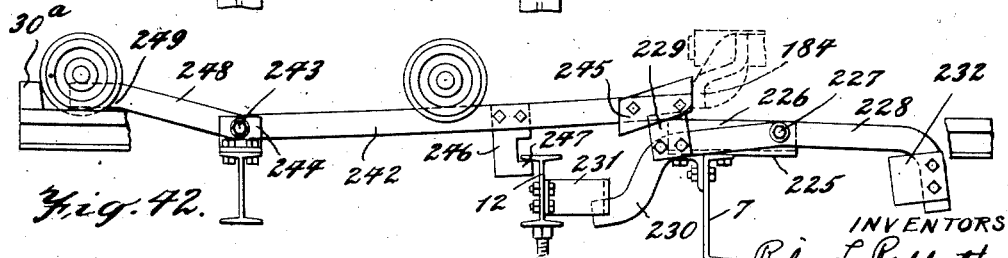

Fig. 11^A is a section on the line 11^A—11^A of Fig. 11;

Fig. 11^B is a horizontal section through a guide block for a safety guard device shown in Fig. 11;

Fig. 12 is a detail plan view, partly in section, showing a running and supporting connection between a truck-moving platform and the frame structure of the machine;

Fig. 13 is a view in side elevation of the structure shown in Fig. 12;

Fig. 13^A is a detail sectional view on the line 13^A—13^A of Fig. 13, and showing a portion of the running connection shown in Figs. 12 and 13;

Fig. 14 is an enlarged detail view of the upper left-hand portion of the construction shown in Figs. 1 and 2 with a truck-carrying platform at a point between the upper and lower trackway, and showing certain manual control mechanism in side elevation;

Fig. 15 is a view similar to Fig. 14, but showing the truck platform in alinement with the upper trackway, and the manual control mechanism in another position of operation from that shown in Fig. 14;

Fig. 16 is a plan view of the manual control mechanism shown in Figs. 14 and 15, other parts being omitted for the sake of clearness;

Fig. 17 is an enlarged detail view of a portion of the control mechanism shown in Figs. 14, 15 and 16;

Fig. 18 is an enlarged detail view, partly in section, showing in side elevation the interlocking control mechanism illustrated in previous figures;

Fig. 19 is a detail view similar to Fig. 18, but showing the parts in another position of operation;

Fig. 20 is an enlarged longitudinal sectional view of the portion of the machine at the right-hand end of Figs. 1 and 2, and showing means for moving trucks or mold carriers from the upper trackway onto the truck-lowering platform;

Fig. 21 is a view in end elevation looking from the right-hand end of Figs. 1, 2 and 20, and showing the truck-moving mechanism at that end of the machine, the truck-lowering platform being omitted for clearness;

Fig. 22 is a detail view, partly broken away and partly in section, of an operating drum forming part of the truck-moving mechanism shown in Figs. 20 and 21;

Fig. 23 is a view in end elevation of the drum shown in Fig. 22;

Fig. 24 is a view in side elevation, partly in section, of a cross-head or carriage for engaging or moving trucks from the platform of the left-hand end of the machine onto the upper trackway;

Fig. 25 is a plan view of the construction shown in Fig. 24;

Fig. 26 is a view in side elevation, partly in section, of a cross-head or carriage for engaging trucks at the right-hand end of the machine to move said trucks onto the lowering platform;

Fig. 27 is a top plan view, partly in section, of the construction shown in Fig. 26;

Fig. 28 is a view similar to Fig. 26, but showing the truck-engaging dog in elevated position;

Fig. 29 is a view similar to Fig. 26, but showing the truck-engaging dog in a downwardly directed position;

Fig. 30 is a detail perspective view of the frame of the cross-head or carriage shown in Fig. 26;

Fig. 31 is a perspective view of one of the elements forming part of the structure shown in Fig. 26;

Fig. 32 is a top plan view of a mold-carrying truck or carriage also of our invention;

Fig. 33 is a view in side elevation of the structure shown in Fig. 32;

Fig. 34 is a view in end elevation of the structure shown in Figs. 32 and 33;

Fig. 35 is a view in side elevation of a mold clamp for clamping a top-plate onto a mold when supported on the mold carriage, and also of lifting means for the top-plate;

Fig. 36 is a view in end elevation of the structure shown in Fig. 35;

Fig. 36A is a top plan view of said mold clamp;

Fig. 37 is a plan view of a safety guard employed in connection with the truck-elevating means, and also shown in front and side elevation, respectively, in Figs. 10 and 11;

Fig. 38 is a plan view of means for locking a truck on the platform located at the left-hand end of Figs. 1 and 2 during the elevating movement of the platform;

Fig. 39 is a view in side elevation, partly in section, of the construction shown in Fig. 38, showing the same in dotted lines in truck-holding position and in full lines in truck-releasing position;

Fig. 40 is a view in side elevation of means located on the platform at the left-hand end of the machine, and operably by a truck on the platform for holding a succeeding truck in proper position to be engaged by truck-holding means on the lower trackway, also shown in said figure;

Fig. 41 is a plan view of the construction shown in Fig. 40;

Fig. 42 is a view in side elevation of the structure shown in Figs. 40 and 41;

Fig. 43 is a detail plan view of means on the right-hand end of the upper trackway shown in Fig. 1 for preventing discharge of a truck from the upper trackway except when the receiving platform is in alinement therewith;

Fig. 43A is a detail plan view of means on the elevating platform at the right-hand end of the machine for holding a truck thereon against accidental discharge during lowering movement of the platform;

Fig. 44 is a view in side elevation, partly in section, showing the holding device of Fig. 43 in truck-releasing position, and the device of Fig. 43A in truck-holding position, the platform rails being in alinement with the upper trackway;

Fig. 45 is a view in side elevation, partly in section, of the truck-holding means in Fig. 43 in truck-holding position;

Fig. 46 is a plan view of a latch for preventing travel of trucks from the right-hand end of the lower trackway onto the platform when the latter is out of alinement with the lower trackway;

Fig. 47 is a view in side elevation, partly in section, of the holding device shown in Figs. 43A and 46, when the truck platform is in truck-discharging relation to the lower trackway;

Fig. 48 is a view in side elevation of a holding device or latch associated with the trackway at the upper left-hand end of the machine shown in Fig. 1 for preventing reverse movement of trucks on the upper trackway, and Fig. 49 is a plan view of a mold top-plate.

Before proceeding with a detailed description of our invention, we would state that in its preferred embodiment it comprises a framework including suitable end structures and upper and lower substantially horizontal trackways along which mold-carriers or trucks are adapted to be moved, and includes elevating means at one end of the trackways by which said mold-carriers or trucks may be elevated successively from the lower trackway and transferred to the upper trackway, and also means by which the trucks may be successively lowered from the upper trackway to the lower trackway in a position to be transferred thereto.

Referring to the drawings by characters of reference, A designates generally a frame structure, comprising a plurality of transverse, parallel beams or supports 1, upon which is supported a lower horizontal trackway, preferably comprising parallel T-rails 2 extending longitudinally of the machine. At each end of said trackway is a vertical end frame structure preferably comprising four columns, two of which are arranged on each side of the trackway, as clearly shown at 3, 3 and 4, 4 in Figs. 1 and 2 of the drawings. Said columns on each side of the trackway are connected and braced by horizontal and inclined tie members 5, 6 and at suitable points the columns on one side of the trackway are connected to those on the other side of the trackway by means of a plurality of transverse, horizontal beams 7, whereby a rigid rectangular structure is provided. The beams 7 also serve as supports for the ends of the lower track rails 2. Each of the columns 3, 4 preferably consists of an I-beam arranged with its web extending longitudinally of the trackway, and its heads or flanges extending transversely thereof, as shown in Figs. 1, 2 and 3. The pairs of columns just described, constituting each end structure, are spaced apart transversely of the trackway a sufficient distance to permit the ends of the rails 2 to pass between them, and to permit trucks, to be hereinafter described, to pass freely along the trackway between said columns, as will be apparent from Figs. 1 and 21 of the drawings.

At a suitable distance above the lower trackway heretofore described, the said side columns of the end structures are connected by intermediate transverse beams or girders 8, which serve as supports for the end portions of beams 9 arranged horizontally, and bridging the space between the extreme end columns of the end structures, said beams being suitably anchored to said girders. The beams 9 preferably consist of I-beams arranged with their webs in vertical parallel relation, and having their lower flanges or heads bolted to the transverse members 8 heretofore mentioned. Mounted on and secured in any manner to the upper flanges of the I-beams 9 are horizontal track rails 10 extending longitudinally of the framework in the same vertical plane as the rails 2 heretofore described, it being understood that the width or gauge of the upper trackway will be the same as that of the lower trackway. It will thus be seen that we provide upper and lower parallel trackways which are adapted to receive suitable trucks for transferring casting molds, as will be hereinafter described.

We will now proceed to describe a preferred embodiment of means for transferring mold-carrying trucks from one of said trackways to the other, and in turn returning such truck or trucks to the first-named trackway. This means preferably comprises a vertically movable elevator arranged at each end of the framework and preferably mounted thereon and supported thereby. By this arrangement of trackways and platforms, we are enabled to successively pass trucks by a station at which the mold is prepared and placed on a truck, then transfer the truck to a pouring station to receive the molten metal to constitute a casting, and then pass the truck through a cooling zone to a point at which the mold is removed from the truck, whereupon the latter may be again presented to the mold-receiving station or position.

In the preferred embodiment herein shown, the mold or flask is placed on the truck preferably while the latter is on the lower trackway at a point between the end frame structures; the truck is then moved onto elevating means at one end of the structure, at which point the metal is poured, whereupon the truck and mold carried thereby are elevated into alinement with the upper trackway, and the truck carrying the mold is moved from the elevating means to the upper trackway along which the truck passes, the cooling of the casting taking place during such passage. The truck is then delivered from the upper trackway onto a vertically movable platform at the other end of the frame structure and may be lowered into alinement with the other end of the lower trackway, at which point the mold may be removed and the truck moved onto the lower trackway to be returned to the mold-receiving and pouring station.

We will now proceed to describe the elevating means at the pouring end of the apparatus, as just described: 11 designates a platform, preferably in the form of a rectangular, horizontal framework, comprising transverse beam members 12 connected at their ends by angle-irons 13, 14, and corner plates or gussets 15, the members 12 extending transversely of the frame structure, and the angle-irons extending longitudinally of the frame structure, said transverse members, angle-irons and gussets being bolted and riveted together, as at 16, 17, to form a rigid structure. At the rear portion the platform 11 is supported rigidly on the lower ends of vertically extending hanger members 18, provided with suitable means for slidably connecting the same to the side standards of the frame and structure, so that the platform may move vertically on said standards. The hanger members 18 are braced and connected at their upper ends by a transverse member 19, whereby said hangers are maintained in vertical, parallel relation, as shown in Figs. 10 and 13. The slidable connection between the platform and the frame end structure may take a number of specific forms without departing from the spirit and scope of our invention, but we preferably employ the following arrangement: On the vertical, inner flange or head of each of the extreme end columns 3, 4 is arranged and secured a vertical guide rail 20 extending inwardly beyond the side edge of said flange, and on the upper end of each of the hanger members 18 is secured a horizontal, rearwardly extending bracket 21, preferably consisting of an angle-iron, upon which is a keeper-plate 22 spaced from said bracket, and between which plate and bracket is located a running roller 23 having bearings in said plate and bracket and adapted to travel on the rear or inner face of the rail 20. A running roller 24 is also arranged between the spaced flanges of the elements comprising the hanger 18, and has bearing in said flanges, said roller 24 being arranged to travel on the outer face of said rail 20, all as shown in Figs. 12 and 13. At the lower end of each hanger member 18 is arranged a horizontal member 25, upon the outer face of which is a keeper-plate 26 spaced from said member 25. Between the keeper-plate 26 and member 25 is a running roller 23ª having bearings in said plate and member and arranged to travel on the rear face of rail 20. A running roller 24ª is arranged at the lower end of the spaced flanges of the elements comprising member 18, and has bearings in said flanges, said roller being adapted to travel on the outer face of said rail 20. If desired, we may also employ suitably mounted running rollers 28, 29 at the upper and lower ends of each hanger member 18 arranged to rotate on an axis at right angles to the rollers 23, 24 and 23ª, 24ª, heretofore described, and to travel in engagement with the edge face of the guide rail, all as shown in Figs. 12, 13 and 13ᴬ. By this means the hangers are properly supported to slide on the end structure, and by proper adjustment of the rolls relative to the guide rail, a smooth and easy travel of the elevating platform is assured.

On the platform 11 are arranged track rails 30 spaced apart a distance equal to the spacing or gauge of the rails 2 and 10, heretofore described, so that when the platform is in its lowest position the rails thereon will aline with the lower main track rails, and when the platform is in its upper position the rails thereon will aline with the upper main rails. The ends of the rails 30 are provided with stops 30ª to prevent a truck from riding over the ends of the rails. A similar construction of the platform is supported on the frame structure at the opposite end of the machine and cooperates with the upper and lower trackways in the same manner as that just described. In view of the similarity of construction, it will be unnecessary to repeat the description already given, as it is applied with equal force to both truck-transferring platforms. The horizontal alinement of rails 30 with rails 2 is assured by adjustable threaded stops 30ᵇ on the foundation and adapted to be engaged by members 12, while alinement with rails 10 is assured by adjustable threaded stops 31ª on the columns 3, 4, and adapted to be engaged by lugs 31ᵇ on the frame of the platform.

We provide power means for elevating and lowering said platforms in order to accomplish the transfer of the trucks from one of the trackways to the other, a preferred embodiment of such means being as follows: Supported preferably by each end frame structure is a vertically arranged power cylinder 31 preferably adapted to be operated hydraulically, and including a piston 32 and vertically extending piston rods 33, each carrying at its upper end a yoke 34 carrying a transverse bearing pin 35 upon which turns a pair of grooved sheaves 36. Mounted on the upper end of the frame at a point above the said pulleys 36 is a horizontal support 37 upon which is supported in suitable bearings a pair of pulleys 38, and on said support 37 at the forward or extreme end of the end structure, and at the transverse center thereof, is arranged another pair of pulleys 39, said pulleys turning on horizontal axes, as shown in Figs. 1 and 10. Anchored, as at 40, to a rear transverse member 7 of the end frame, are the ends of parallel cables 41, which are looped around the said pulleys 36 on the piston rods 33, and are thence carried up over the pair of pulleys 38, across the upper end of the end frame, down over the pulleys 39, and are suitably connected, for example, by turn-buckles and swivels 41ª to the upper transverse member 19 forming part of the elevator structure. By this arrangement the piston in the cylinder 31 may be subjected to pressure to take up the cables 41 to thereby lift the elevator, said piston being operated to pay out the cable when it is desired to lower the elevator. The same means may be employed for raising and lowering the elevator at the opposite end of the framework, and, therefore, the description already given need not be repeated.

We will now describe means for controlling flow of the water or other pressure agent to the power cylinders 31 in order to operate the elevators: 42 designates a supply pipe for the motive agent, for example hydraulic pressure, to which is connected a vertical pipe 43 at one end of the machine, the upper end of which pipe is connected to a horizontal pipe 44 extending lengthwise of the machine to the opposite end thereof, and connected at that end to the inlet port of a three-way valve casing 45. At the pouring end of the machine the vertical pipe 43 is connected by a short pipe section 46 to the inlet port 47 of a three-way valve casing 48 having two outlet ports 49, 50, one of which (49) is connected by a pipe 51 to the inlet end of the power cylinder, and the other of which (50) is an exhaust port. The three-way valve 45 at the opposite end of the frame, i. e., the shake-out end, is provided with a port 52, which is in communication with a pipe 53 connected to the cylinder 31 on the inlet side of the piston in the said cylinder at that end of the frame. Connecting the exhaust outlets from the three-way valves 45, 48, is an exhaust or waste pipe 54 which discharges into a pipe 55 leading to a waste pipe 56. The arrangement is such that when the three-way valve 48 is operated to throw the motive agent into the cylinder 31 at the pouring end, through the pipe 51, the piston in said cylinder will be forced downward to take up the cable and lift the elevator. A corresponding operation takes place when the three-way valve 45 is operated to pass the motive agent through the pipe 53 to the inlet side of the cylinder at the shake-out end, it being understood that the separate valves provide for independent operation of the cylinders and the elevators operated thereby. When either of the valves is operated to shut off the supply of liquid to the cylinder 31 and to connect the pipe 54 with the outlets from the valves, the weight of the elevator, through the rope connections, lifts the piston against the liquid therein and forces it out and back through said pipes 51, 53 and valves 48, 45 into the waste pipe 54. Both cylinders may be provided at their bases with waste outlets 57 through which accumulation of water in the bottoms of the cylinders may drain into a pipe 58 leading to the waste pipe 56.

The three-way valves 45, 48 may be of any desired construction, for example, that shown in Fig. 9, consisting of a casing having the inlet supply port 47, the outlet port 49 leading to the hoisting cylinders, and the exhaust port 50 communicating with the waste pipe 54, said casing containing a turn plug 59 arranged to turn on a horizontal axis, and having a cross port 60 adapted to be moved, upon rotation of the plug, to establish communication between the inlet port 47 and the cylinder supply port 49, or to shut off communication between said inlet port and the supply port and connect the latter with the exhaust port 50.

The outer end of the valve plug 59 is provided with poly-faced wrench head 61 adapted to be operatively engaged with a socket 62 in a socket-piece 63 carried upon one end of a horizontal shaft 64 arranged to turn in bearings in parallel plates 65 of a bracket member 66 bolted, as at 67, to one of the vertical columns 3 forming part of the end frame structure heretofore described, and preferably at a point adjacent the upper trackway (see particularly Figs. 6, 10, and 14 to 19, inclusive). At its outer end adjacent the side of the machine, the shaft 64 is provided with an arm 68 connected by a connecting rod 69 to the outer end of an arm 70 rigidly mounted on a controller shaft 71 which oscillates in bearings 72 in a bracket 73 rigidly secured to the end column 3 of the end structure. The controller shaft 71 is provided with a hand lever 74 rigidly connected thereto, by means of which the valve-operating shaft 64, heretofore described, may be operated in a manner and under the conditions to be hereinafter described.

A similar arrangement and construction is provided at the opposite end, or shake-out end, of the machine for operating the three-way valve 45 for controlling the flow of motive agent to the power cylinder at that end of the machine, and in view of the similarity of the construction it will be unnecessary to repeat the description with reference thereto. It will be seen, however, that in both cases, by operation of the valve, the vertically movable platform constituting the truck-transferring means may be raised and lowered to take position opposite the end of either the upper or lower trackway, so that the platform at the pouring end may receive a truck from the lower trackway and be elevated to a position in line with the upper trackway, so that the truck may be run from the platform onto the upper trackway. At the other end, or shake-out end, of the machine, the platform may take position in line with the discharging end of the upper trackway to receive a truck therefrom, whereupon the platform may be lowered to a position in line with the receiving end of the lower trackway to permit the truck to be moved from the platform onto the lower trackway.

Our invention also contemplates the provision of means for moving the trucks from the elevating means or platform at the pouring end of the machine onto the receiving end of the upper trackway, which truck-moving means will now be described: Supported by the upper trackway structure is a horizontally disposed, double-acting power cylinder 75, containing a piston 76 carried by a piston rod 77, the outer end of which is adapted to be connected to a lug, as at 78, on the rear end of a puller carriage 79. The puller carriage comprises a rectangular frame 80 adapted to travel between and be guided by horizontal track members 81 arranged between the upper track rails 10 and extending longitudinally thereof. The puller carriage is provided at its rear portion with running rollers 82 adapted to travel beneath said track guideways, and at an intermediate portion the carriage is provided with running rollers 83 adapted to travel upon the upper surfaces of said track guideways. By this arrangement free reciprocatory motion of the puller carriage is assured, and the same is also prevented from displacement from the track guides. At its forward end the carriage is provided with a pivoted latch or dog 84 which is mounted on a pin 84$^a$ for yielding, swinging movement rearward of the carriage, such movement being afforded by a spring-actuated plunger 85 seated in a socket 86 on the carriage frame, said spring plunger normally urging the dog toward and in engagement with a lug or stop 87 on the carriage, whereby the swinging movement of the dog in one direction is limited, for a purpose to be presently described.

The cylinder 75 heretofore described is provided at each end with a combined inlet and outlet port 88 to provide for the inlet and exhaust of fluid pressure to the ends of the cylinder alternately, in order to positively reciprocate the piston 76 and move the puller cross-head positively in both directions. Connected to the ports 88 are pipes 89, 90, which in turn are connected to oppositely disposed ports 91, 92 in a four-way valve casing 93, which is provided with an inlet port 94 connected by a pipe 95 with the fluid pressure supply pipe 43 heretofore described, and said casing is also provided with an exhaust port 96 connected by a waste connection 97 with the waste pipe 54 heretofore described. Within the casing is a rotary valve plug 98 provided with oppositely disposed through ports 99, 99$^a$ separated by a diaphragm 100, as will appear from Fig. 8 of the drawings. This valve is so arranged that when the plug 98 is turned in one position, fluid pressure will be admitted through the port 91 and pipe 89 to the rear end of the cylinder, pushing the said piston and cross-head 79 forward, while the opposite end of the cylinder will be connected by the pipe 90 to the exhaust port 96 so that the fluid in the cylinder on the forward side of the piston may exhaust into the waste line 54. When the valve plug 98 is turned to its other position, the forward end of the cylinder will be connected to the supply port 94 through port 92, and the rear end of the cylinder be connected to the exhaust 96, so that the piston and cross-head will be moved in the opposite direction to retract the puller cross-head. When the piston is moved forward, the dog 84 on the puller carriage 80 strikes the lug 178 on the truck located on the elevator platform and yields in a rearward direction, so that said dog may pass under said lug and take a position in front of the same when the carriage reaches its full forward movement, thereby connecting the carriage or cross-head to said truck. When the carriage is moved in its rearward direction, it pulls the truck from the platform onto the receiving end of the upper trackway, due to the connection between the dog 84 and the truck, as heretofore described.

The outer end of the valve plug 98 is provided with a wrench head 101 adapted to be seated in a socket-piece 102 carried on the end of a horizontal operating shaft 103 running parallel to the shaft 64 heretofore described, and arranged to oscillate in bearings in the bracket 66. At its opposite end from that carrying the said socket-piece, the shaft 103 is provided with an arm 104 rigidly connected thereto, which arm is connected by a link 105 to the outer end of an arm 106 rigidly mounted on an oscillating controller shaft 107 in the bracket 73 heretofore described. The shaft 107 is provided with a hand lever 108 by which said shaft may be oscillated, and through the connections just described operate the valve 93 to control the flow of fluid to the cylinder 78 to reciprocate the puller cross-head. Fixed to the shaft 107 is a lever arm 107$^a$ carrying a weight 107$^b$ in order to balance and facilitate operation of the associated parts.

Our invention also contemplates the provision of means for preventing reciprocation of the puller cross-head while the elevator platform is out of alinement with the receiving end of the upper trackway, and also to prevent lowering of the elevator from alinement with the upper trackway while the puller cross-head is being operated. This means consists of interlocking devices between the controller for the elevator raising and lowering mechanism, and the controller for the truck-moving means constituted by the reciprocating cross-head. On the shaft 103 for controlling the cross-head is a segment 109 fixed suitably to said shaft, as at 110, and provided with an arcuate circumferential face 111 concentric with said shaft, said segment being also provided with a radially projecting stop-lug 112 at one end of said arcuate face. On the shaft 64 for controlling the elevator valve is a segment 113 fixed suitably to said shaft, as at 114, and provided with a concentric arcuate face 115 formed on the same length of radius as the face 111 heretofore described, and adapted to turn within a re-entrant face or recess 116 on the segment 109 on the shaft 103. The disc or segment 113 is also provided with a re-entrant face 117 formed on the same radius as that of the circumferential arcuate face 111 on the segment 109. The segment 113 is also provided with a stop arm 118 adapted to cooperate with the stop 112 on the opposite segment, and the arcuate face 115 is provided with a stop lug 119 adapted to cooperate with a lug or arm 120 on the segment 109. The segment 113 is also provided with a lateral, concentric flange 121, one end of which constitutes a stop 122, in a manner to be presently set forth.

When the elevator is out of alinement with the upper trackway, the controllers for the elevating cylinders 31, and the cylinder 75 for the truck-moving means, are in the position shown in Figs. 14 and 18 of the drawings, wherein it will be seen that the stop 119 on the elevator segment is against the stop 120 on the cross-head segment, and the arcuate face 115 on the elevator segment 113 is within the re-entrant face 116 on the segment 109, under which conditions rotation of the controller shaft 103 for the puller cross-head is prevented, and the cross-head cannot be operated. It will also be seen that with the parts in the relation just described, the elevator segment 113 can only be turned in a clockwise direction. When the operator desires to raise the truck elevator, the lever 74 is moved downward from the position in Fig. 14, which serves to throw the segment 113 to the position shown in Figs. 15 and 19 of the drawings, whereby the arcuate face 115 on the elevator segment is moved out of the re-entrant face 116 on the puller cross-head segment. By this operation of the lever 74 the valve 48 is operated to admit fluid pressure to the cylinder 31, and the elevator is raised until its upper end strikes the adjustable stops 30ª, at which time the track rails on the elevator platform will be in alinement with the track rails at the truck-receiving end of the upper trackway.

When the parts are in the position shown in Fig. 19, it will be seen that the re-entrant face 117 on the elevator controller segment 113 will be in position to receive the arcuate face 111 on the puller cross-head segment 109, which will permit the operator to pull down on the lever 108 and rotate the segment 109 in a counter-clockwise direction until the stop 112 engages the stop 118, which prevents further rotation of the puller cross-head segment. As soon as the dog 84 heretofore described is engaged with the truck, the operator throws the puller-lever 108 in a clockwise direction, returning the segment 109 to the position shown in Fig. 19. It will thus be seen that the puller cross-head can only be actuated after the elevator controller has been operated to bring the elevator to a position in alinement with the receiving end of the upper trackway.

The interlocking arrangement between the controllers also contemplates means whereby the controller for the elevator cannot be actuated when the puller cross-head is out of its initial position, that is, is at an intermediate point in either its forward or rearward reciprocation, the purpose being to prevent lowering of the platform while the cross-head is being operated to pull a truck from the platform onto the upper trackway. This means comprises a pivoted latch bar 123 fulcrumed at a point intermediate its ends, as at 124, upon the bracket 66 heretofore described, and having a depending locking end provided with a locking recess 125 adapted to set over and receive the abutment face 122 on the lower segment when the latter is in the position assumed, in order to bring the truck-elevating platform into alinement with the upper trackway (see Figs. 15 and 19). The upper end of this latch bar 123 is pivotally connected, as at 126, to a link 127, the opposite end of which is pivoted, as at 128, to an arm 129 fixed on one end of a shaft 130 turning in a bearing in a bracket 131 on the inner column 3. The opposite end of the shaft 130 is provided with an arm 132 connected pivotally, as at 133, to one end of a link 134, the opposite end of which is connected pivotally, as at 135, to an arm 136 fixed to a shaft 137 mounted in a bracket 138 on the horizontal frame member 139 supported by members 8, 8, said shaft 137 carrying an arm 140 extending upward into the path of movement of the rear end of the puller cross-head heretofore described.

On the shaft 130 heretofore described, is an arm 141 carrying a weight 142 which normally tends to throw the latch 133 into the position shown in Figs. 15 and 19. The arrangement is such that when the puller cross-head is in its rearmost position, as shown in Figs. 1, 2, 3 and 14, it engages the arm 140 to thereby move the latch to the position shown in Figs. 14 and 18, that is, in such position as to permit free movement of the segment 113, but when the cross-head controller is moved so that the parts are in the position shown in Fig. 15, the puller carriage moves out of engagement with the arm 140, and the weight 142 is free to throw the latch 123 into the position shown in Figs. 15 and 19, wherein the engaging end of the latch engages the face 122 to hold the elevator controller against operation necessary to relieve the pressure in the elevator cylinder to permit the platform to descend. By this arrangement it will be seen that the elevator controller is locked against operation during reciprocation of the puller carriage and the operator cannot operate the valve 48 to permit descent of the platform. When the puller carriage is returned to its initial position as shown in Fig. 3, said carriage engages the arm 140, thereby throwing the latch 123 out of engagement with the segment 113 and permitting the latter to be returned to the position shown in Figs. 14 and 18, the segment being free to turn in the re-entrant face 116 in the segment 109.

We also provide means at the delivery end of the upper trackway for moving trucks from the upper trackway to the lowering platform at that end of the machine. A preferred form of this means comprises a trackway supported by the upper framework preferably between rails of the truck-trackway, and including horizontal guide rails 143 extending longitudinally of the truck-trackway and preferably offset from the center line of track 81, as clearly shown in Figs. 2, 3, 4, 20 and 21 of the drawings. On the trackway 143 is arranged a carriage, preferably in the form of a casting, consisting of vertical, side members 144 and a transverse, connecting member or web 145. The side members of the casting are provided at their upper, opposite ends with apertured bosses 146 receiving the outwardly projecting bearing pins 147, upon each of which is arranged a running roller 148, which running rollers are adapted to travel on the upper surface of the track rails 143. The forward portion of the side members 144 are also formed with lower, outwardly projecting bosses 149 in which are fixed pins 150, upon each of which is arranged a running roller 151, said rollers being adapted to travel on the under faces of the said track rails 143, whereby said carriage is freely movable lengthwise of said track rails. In the space between the side members 144 is a vertically swinging yoke, consisting of side bars 152 united by a transverse web member 153 (see Fig. 31). The rear ends of the side bars 152 are pivotally mounted, as at 152ª, upon the projecting, inner ends of the pins 147 heretofore described, and at the forward ends the said yoke carries a transverse pivot pin 153ª upon which is pivoted a dog 154 at a point intermediate its ends, said dog having a forward and upwardly inclined engaging portion 155 provided with an inclined engaging face 156 which is adapted to engage behind a part on a truck as will be hereinafter described. The dog is also provided with a weighted rear portion 157 which normally gravitates to the position shown in Fig. 26, whereby the dog is normally maintained in the position shown in said figure.

On the bearing pin 147 for each of the rollers 148, is pivotally mounted an inclined scraper device or shoe 158 which travels on the upper surface of the adjacent track 143 and serves to remove dust, sand or other accumulations thereon which might interfere with the free and smooth travel of the carriage along its trackway. The carriage frame is provided at its rear end with a depending lug 159 to which is suitably connected, as at 159ª, an endless, flexible cable 160 which passes rearwardly to and over a guide sheave 161 (Figs. 3, 4 and 20), which is suitably supported on the trackway, thence over a guide or running sheave 162 supported on the end frame structure, and is then wound in the groove 163 of a spirally grooved drum 164 mounted on a horizontal shaft 165 supported in bearing brackets 166 on the end frame, and adapted to be revolved by a hand wheel 167, or other suitable means. The cable is suitably clamped, as at 164ª, to said drum and passes from said drum over a lower guide wheel 168 on the frame, and upper guide wheel 169 located adjacent the outer end of the trackway 143, and then to connection 159ª heretofore described. It will thus be seen that by revolving the hand wheel 167 in either direction, the grooved drum 164 will be correspondingly rotated, and the carriage moved in either direction, as may be desired. When the lowering platform is in line with the delivery end of the upper trackway and it is desired to push a truck from the upper trackway onto said platform, the operator revolves the drum 164 to cause the carriage to take such position that the inclined face 156 of the dog 154 will be in rear of some part, for example, a lug on the truck, as will be presently set forth. If in performing this operation it is necessary to remove the carriage from a position in advance of the lug, the head of the dog will strike beneath said lug and the dog will pivot on its pin 153ª, so that the dog may ride under said lug and then return to operative, yielding position after the dog has cleared the lug. The operator then turns the drum in the opposite direction, which causes the carriage to push the truck along the truck trackway and onto the lowering platform, provided the latter is in proper position to receive the truck; whereupon the operator retracts the carriage and dog, disengaging the latter from the truck, and returns the carriage to position shown in dotted lines in Fig. 20. If it should happen that the carriage be in the position shown in full lines, Fig. 20, when the platform is elevated, the upper member of the platform hanger will strike beneath the dog and lift the same and its yoke upon the yoke pivots 147, so that the dog will yield and be permitted to clear the platform as the latter moves toward position in alinement with the delivery end of the upper trackway. If it should be left in the position shown in Fig. 20, the lug on the truck, or the upper member of the frame, will contact with the upper face 156 of the dog, depressing the dog (as shown in Fig. 29) about the pivots 153ª and thus prevent damage to the carriage.

We will now describe one form of mold-carrying truck adapted to be used in connection with the molding machine constituting our invention:

The truck may take a number of forms, but we prefer to employ the following, referring particularly to Figs. 32 to 34: The truck comprises a body or platform 170 which may, and preferably does, constitute the bottom board for a mold or flask employed in the casting operations. The body 170 is provided on its under side with longitudinal and transverse, parallel bracing webs 171, 172, preferably cast integral therewith, in order to provide a rigid and substantial structure. Bolted to these webs are journal boxes 173 of any suitable construction adapted to receive the ends of axles 174, upon which are mounted flanged trackwheels 175 by which the truck is supported upon and travels along either the lower or upper trackway heretofore described. The upper surface of the bottom board is preferably arranged at an incline, as shown in Fig. 33, so as to support a flask in inclined position to provide for proper flow of the molten metal in the flask when the pouring operation is performed. At one end, and preferably at a point equidistant from the sides of the body, is provided a bracket member 176 bolted, as at 177, to the end of the body, and provided with a depending flange constituting a lug 178 providing a coupling member adapted to be engaged with the latch or dog 84 heretofore described, so that the puller cross-head may be operated upon its return movement or reciprocation to pull the truck from the elevating platform to the upper trackway. The bracket member 176 may also be provided with a suitable buffer in the form of a plunger head 179 having a pin 180 mounted in a socket 181 in said bracket member and cushioned by rubber blocks 182 arranged in the socket between the rear of the head and the inner wall of the socket, this buffer member being adapted to cooperate with a similar buffer member on the adjacent end of another truck.

At its opposite end from that just described, the truck is provided with a bracket member 183 bolted to the body, as at 183ª, having a depending lug 184 offset from the lug 178 so as to be engaged by the dog 154 heretofore described for moving the trucks from the upper trackway to the lowering platform at the shake-out end of the machine. The lug 184 is braced by a suitable bar 184ª bolted thereto and to the truck body. By offsetting the carriages 79, 144, and the lugs 178, 184 on the truck, it is assured that each of the carriages will always engage its proper lug.

As heretofore stated, the body or platform of the truck preferably constitutes the bottom plate of a mold or flask, and we preferably provide a top plate for the mold, which is preferably carried by the elevating platform which also carries means for moving the top plate relative to the mold.

In the drawings, the trucks are shown of a sufficient transverse width or capacity to carry two molds side by side, and, in the present embodiment, two top plates are employed. These top plates are shown at 185, 185, and may be of any desired construction, but preferably comprise rectangular plates each having a flat under face 186, and the upper side of each plate being provided with marginal ribs or flanges 187 and intermediate transverse and longitudinal ribs 188, 189, intersecting each other and joined at their ends to said marginal ribs. These top plates are suspended by flexible connections 190, for example, chains, from a vertically movable beam or cross-bar 191, which, in turn, is supported at its central portion by a bolt 192 held in a yoke 193 carried by the lower end of a plunger rod 194 constituting the piston rod 194ª of an air-hoist cylinder 195 which is mounted on angle members 196 on bracket members 196ª secured to the transverse frame-member 19 and transverse member 19ª forming elements of the truck-hoisting platform heretofore described. The air-hoist cylinder may be, and preferably is, of the single-acting type. The cylinder is provided at its base with a combined inlet and exhaust port 197 connected by a pipe 198 to a control valve 199, preferably of the three-way type fed with compressed air or other motive agent through a feed pipe 200 leading to a suitable source, said valve having an exhaust 201. The arrangement is such that the valve is operable by a handle 202 to connect the supply with the port 197, or to shut off the supply and connect said inlet port to the exhaust 201 of the valve. When motive agent is admitted to said cylinder, the piston of the latter operates to lift the top plates, the upward movement of the latter being limited by contact of the piston with head 195ª of cylinder 195. When the agent is exhausted from the cylinder the top plates are permitted to gravitate into position on the mold on the truck which is on the platform. Rotation of cross-bar 191 is prevented by guiderods 203 rigidly bolted, as at 204, to elements 196ª, and located in contact with one side of said bar.

Suitable means is provided for clamping the mold or molds between the top plate or plates and the bottom plate while the molds are in position on a truck and while the latter is on the elevating platform. This means preferably comprises a clamp-beam 205 comprising vertically spaced plates 205ª held together in spaced relation by transverse bolts 206 and spacers 206ª. This beam is supported at its central portion by a pin 207 at the longitudinal center of a clamping-yoke 208 having down-turned ends 209 carrying pins 210 adapted to be seated in sockets 211 in the top-plates, the arrangement being such that the beam 204 is adapted to fulcrum on said pin 207. On the top-plate or plates are arranged and rigidly secured by bolts 212 slotted brackets 213 which straddle the beam 205 on opposite sides of its fulcrum, and prevent said beam from falling over sideways. At one end the beam 205 is provided with a transverse pin 214 upon which is fulcrumed a clamping-hook 215, the bill of which is adapted to be hooked under the bottom-plate, as shown in Figs. 10 and 36. The upper portion of the hook is provided with an arm 216, to which is connected, as at 217, one end of a pull-rod 218 which extends lengthwise of the beam 205, and the opposite end of which is provided with a handle 218ª adapted to be grasped by an operator to swing the hook 215 on its pivot. The rod 218 is provided with an offset 218ᵇ adapted to engage with pin 218ᶜ to hold said rod in position to maintain hook 215 out of engagement with the bottom-plate.

The opposite end of the beam 205 from that carrying the hook lever 215 carries a clamp block 219 arranged between the members 205ª, and having a vertical slot 219ª to receive said spacer block 206ª, whereby said block 219 is supported on the beam and is adapted to slide vertically on said spacer block 206ª. The block 219 is provided at its lower end with spaced ears 220 supporting a hanger-pin 221 which passes through a longitudinal slot 222 in a clamping hook 223, the bill of which is adapted to be hooked under the bottom-plate. The clamping block 219 carries an adjusting screw 224 threaded through the end thereof, the inner end of said screw projecting within the upper end of said slot 219ᵃ and adapted to bear on the upper face of said spacer block 206ᵃ whereby the block may be adjusted to pull the hook into clamping position or to release the same from such position. The slotted connection between the hook and clamping block permits the hook to be moved to horizontal position, so that the mold may be placed on or removed from a truck without interference on the part of said hook. When the top-plates are to be applied to a mold, the cylinder 195 is operated to lower the plates onto the mold, after which the rod 218 is operated to swing the hook 215 under the bottom-plate; the hook 223 is then engaged under the bottom-plate and screw 224 is operated to take up on the block 219 and hook, whereby the clamp mechanism operates to clamp the top-plates in position. It will be understood that one or more clamping devices as described may be employed. When the mold is to be released, the screw 224 is operated to relieve the clamping pressure and the hooks are swung out of engagement with the bottom-plates, whereupon the cylinder 195 may be operated to lift the top-plates clear of the mold or molds.

We also provide means whereby the trucks are prevented from being discharged from the discharging end of the lower trackway when the elevating platform 11 is out of truck-receiving alinement therewith. This means comprises a latch device which is adapted to move into truck-holding position when said platform is out of alinement with the trackway, and to be moved to release position by the platform when the latter is in its lowermost position and ready to receive a truck, said latch being constructed as follows (see Figs. 11, 41 and 42): Secured to one of the transverse, horizontal members 7 of the end frame structure is a bracket-plate 225 having a flange 226, upon which is fulcrumed at a point intermediate its ends, as at 227, a latch lever 228 carrying a latch-piece 229 which, when the lever is swung in one direction, is adapted to move into the path of some part of the truck, so as to obstruct travel of the latter toward the platform, said part preferably being the lug 184 heretofore described.

At its forward end, or that end adjacent the elevator platform, the latch lever 228 is provided with a releasing device consisting of a depending arm 230 which is arranged to project in the path of a lug 231 secured rigidly to the adjacent, transverse member 12 of the platform 11. The opposite end of said lever from that carrying the releasing device, is provided with a weight 232, which normally tends to move that end of the lever downward and throw the latch-piece upward into the path of a truck. The arrangement is such that when the platform 11 moves to lowermost position, the lug 231 engages the releasing arm and throws the latch 229 downward out of holding relation to the trucks, the latch 228 and latch 229 being held in this position so long as the platform is in alinement with the lower trackway, and thus permitting free passage of a truck from the trackway to the platform. As soon, however, as the platform 11 leaves its lowermost position, as when lifting a truck, the lug 231 moves away from the releasing device 230 and permits the weight 232 to throw the latch 229 upward into position to obstruct passage of the truck beyond the delivery end of the lower trackway.

The platform is preferably provided with means for holding a truck thereon while the platform is being raised to the upper trackway, this means preferably consisting of a latch lever 233 fulcrumed at a point intermediate its ends, as at 234, upon a bracket 235 bolted to the upper flange of the outer platform member 12. The lever 233 is provided at its inner end portion with a latch plate 236 adapted to move upward into position behind some part of the truck, for example, the rear axle, so as to prevent the truck rolling inward toward the frame while the platform is between the lower and upper trackways. The latch lever is provided at the end opposite to that carrying the latch 236 with a weight 237 normally tending to raise the latch-piece 236 into locking relation to the truck. The end of the lever adjacent the latch-piece is provided with a releasing device, consisting of a depending arm 238 which is adapted to engage a lug 239 fixed to the frame-member 9 supporting the upper trackway 10, so that when the platform reaches discharging relation to the upper trackway, said releasing device strikes said lug, and the latch-piece is thereupon moved downward out of holding relation to the truck, and the latter is free to be rolled out upon the upper trackway by the puller cross-head 80 heretofore described.

When the truck has been discharged from the platform and the platform descends, the releasing device 238 moves out of releasing relation to the lug 239 and the weight 237 thereupon returns the latch to holding position, so as to be in position to again engage a truck when the latter passes to the platform from the lower trackway. The swinging movement of the latch lever upwardly is limited by a stop-plate 240 bolted to the lever and having a locking projection 241 extending under and adapted to engage with the under face of the flange of the beam 12 upon upward movement of said lever, as shown in dotted lines in Fig. 39 of the drawings.

Provision is made for preventing travel of the trucks along the lower trackway toward the elevating platform after a truck has already passed to and occupies the platform, and while the latch 229 is still in position to permit passage of the trucks. This means comprises a latch lever 242 (see Figs. 11, 41 and 42) fulcrumed at a point intermediate its ends, as at 243, on a bracket 244 on the outer, transverse beam member 12 of the platform, the inner end of said lever extending across the platform to a point within the end of the lower trackway and carrying on its end an upwardly-extending latch-piece 245 which, when the lever is moved upward, takes position in the path of movement of the truck, for example, the lug 184 heretofore described, so as to prevent travel of the truck toward the platform. The upward movement of this locking lever 242 is limited by a stop device in the form of a plate 246 fixed to the lever and having a projecting lower end 247 extending under the lower flange of the I-beam 12 and adapted to engage the same, for the purpose stated. At its outer end the latch lever is provided with an upwardly inclined portion 248, and a substantially horizontal portion 249 so located when the latch is in its lowered or releasing position that the inclined portion will be in the path of movement of the forward axle of the truck, whereby the axle strikes said inclined portion and swing the lever downward and raises the latch-carrying end of the lever to bring the latch into holding position, as shown in Fig. 11, the axle then passing onto the horizontal portion 249 and holding the latch 245 in truck-intercepting position so long as a truck is in position on the platform. The preponderance of weight of the lever is at the latch-carrying end thereof, so that the latch automatically drops out of locking position when the truck moves off the platform at the upper trackway a sufficient distance to move the axle out of engagement with the horizontal portion 249 and the inclined portion 248, whereby the latch drops to a position clear of the truck moving from the platform.

On the upper trackway is provided suitable means for preventing backward travel of trucks thereon, so as to prevent accidental falling of the truck from the end of the upper trackway when the elevating platform is out of alinement therewith. This means (Figs. 14, 15 and 48) comprises a locking lever 250 fulcrumed at an intermediate point, as at 251, on a bracket-piece 252 bolted to one of the tracks 81, the outer end of said lever being heavier than the inner end, and being arranged to normally throw the inner end upward into position behind a part of the truck, for example, the rear axle, whereby the backward movement of the truck on the upper trackway is prevented. When the truck moves onto the platform, the axles or other parts ride over the locking end of the latch, the latter yielding or descending and resuming locking position when cleared by the truck.

Means is provided at the discharging end of the upper trackway to prevent accidental discharge of trucks therefrom when the lowering platform is out of truck-receiving relation thereto (see particularly Figs. 20, 43, 44 and 45). This means preferably comprises a vertically movable stop-piece 253, preferably in the form of a bar adapted to be moved upward into position in front of the truck axle to prevent travel of the truck, said bar being pivotally mounted, as at 254, between the ends of two spaced lever plates 255 fulcrumed, as at 256, upon a bracket 257 rigidly mounted on a transverse frame member 8ª, one of said plates having at its rear end a downwardly-extending lug 258 adapted to engage with said frame member to limit upward vertical movement of the stop-piece, and the other of said bars being extended rearwardly, as at 259, and carrying a weight 260 normally tending to thrust said stop-piece into truck-engaging or intercepting position. At its lower end the stop-piece is pivoted, as at 261, to one end of a link 262, the other end of which is pivoted, as at 263, on a bracket 264 secured to a transverse frame member 8, the said lever 262 serving to prevent swinging movement of the stop-piece on the fulcrum 254 but permitting free up and down movement of said stop-piece. The outer end 259 of the lever 255 carrying the weight 260 projects into the path of movement of an arm or lug 265 bolted, as at 266, to the inner, transverse member 12 of the platform 11, the arrangement being such that when the platform moves into truck-receiving relation to the upper trackway 10, said lug 265 engages said lever 259 to thereby move the stop-piece 253 downward out of truck-obstructing position, so that a truck may be discharged from the upper trackway onto the platform, as heretofore described. As soon as the platform descends, the weight 260 operates to throw the stop-piece 253 upward into position to prevent movement of the truck toward the discharging end of the upper trackway.

The lowering platform is also provided with means to prevent discharge of trucks therefrom toward the framework during the descent of the platform, which means (see Figs. 43ᴬ, 44 and 47) comprises a pivoted latch 267 fulcrumed at a point intermediate its ends, as at 268, on a bracket 269 bolted to the upper flange of the outer platform beam 12, said latch lever having an engaging end 270 normally extending upward into the path of movement of the truck, and being of such length that it will take position behind the axle of a truck when the latter is against the stops on the platform, the opposite end of the latch lever being weighted by a depending portion 271 so as to tend to maintain the latch lever in locking position. When a truck passes onto the platform, the truck parts can ride over the locking end of the latch, the latter rising into locking position behind the axle or other part, when the same shall have cleared said locking end, in a manner which will be obvious. When the platform reaches its lowermost position, the part 271 will strike the ground (see Fig. 47), or any suitable object, to throw the latch down to permit a truck to be moved from the platform onto the lower trackway. Upward movement of the engaging end 270 is limited by a projecting portion 269ª on the bracket 269.

On the receiving end of the lower trackway is provided means for preventing such backward movement of the trucks as might result in accidental displacement thereof from that end of the trackway. This means (see Figs. 20, 46 and 47) comprises a gravity operated latch lever 272 fulcrumed at a point intermediate its ends, as at 273, upon a bracket 274 bolted to the transverse frame member 7 heretofore described, said latch having an engaging end 275 normally extending upward into the path of movement of a truck part, for example, the rear axle, the opposite end of the lever being of greater weight than the latch end and bent downward and forward to constitute a stop 275ª adapted to cooperate with the frame member 7 to limit the movement of the locking end of the latch in the locking direction, so that said end will be positioned with accuracy behind the part of the truck with which it is designed to cooperate.

From the above description it will be seen that efficient and simple provision is made for preventing accidental displacement of the trucks from either the upper or lower trackways, or the raising and lowering platforms when the latter are not in proper relation for the intended operation of the trucks.

We also provide safety means at either or both of the elevators or platforms for preventing an operator from standing under the platform and being injured upon descent of the latter, said means preferably assuming its safety or preventing position while the platform is elevated, and being automatically moved out of such position when the carriage reaches a period in its descent where an operator would not be likely to get under the platform. This safety-guard means (see Figs. 10, 11 and 37) preferably comprises a horizontally disposed frame-work composed of side-bars 276 spaced apart a distance greater than the width of the platform and joined at their outer ends by a transverse end member 277 rigidly connected to said side members, thereby forming a frame surrounding the platform. The member 277 carries a frame 277ª which projects out beyond the ends of the rails 30 on the platform. At the inner ends thereof, the side bars 276 are connected to the lower ends of vertical hanger-bars 278 arranged on opposite sides of the platform and are slidably arranged in and guided by roller guide brackets 279 rigidly connected to and carried by the side members 18 of the platform hanger frame. At the lower ends of each of the bars 278 is a guide-block 280, to which is bolted a guide-block plate 281, said block and plate being spaced apart so as to receive between them one of the vertical side flanges on the columns 3 and 4, the arrangement being such that said bars are vertically slidable on said columns and also have a sliding connection with the platform.

To the upper end of each of the bars 278 is suitably connected as at 282, the end of a cable 283, which is carried upward and over a guide-sheave 284 mounted on a bracket 285 on the upper end of the end frame structure, said cable being carried downward from said sheave and connected to a counterweight 286 having upper and lower spaced guide lugs 287 cooperating with a vertical guide bar 288 rigidly mounted on and spaced from the adjacent column, said weight being arranged between the guide bar and the column. On the side-bars 278 and a suitable distance above the guard-frame are rigid abutments 289 adapted to be engaged by the roller brackets 279 upon descent of the carriage, whereby the safety guard frame is moved downward. When the platform is in elevated position, the parts are in the general position shown in dotted lines in Fig. 11, in which the horizontal guard frame projects beneath the platform and prevents the operators from getting under the platform. Upon descent of the platform, the guard remains in the position shown in dotted lines in Fig. 11 until the guide-brackets 279 strike the abutments 289 after which the frame will be moved downward by the platform, so that the frame will be out of the way when the platform is in alinement with the lower trackway. When the platform is again elevated the weight 286 will lift the guard in pace with the platform until the weight descends against the stop 290 at the lower end of its guide 288, at which time the guard-frame will stop at the safety position and the platform will continue its upward movement. The bolts 282 constitute stops located above the brackets 279 to prevent displacement of said rods from said brackets.

We have hereinbefore set forth the operation and function of the several mechanisms comprised in a preferred embodiment of our invention, and will now set forth the operation of the complete mechanism: As heretofore stated, the station at which the sand mold is made in the flasks, is preferably at a point adjacent the lower trackway and between the end-frame structures. At this station the mold, for example, for producing cast-iron or other cast-metal heating boiler or radiator sections, is prepared by the molders and placed on the trucks heretofore described. When a mold or molds, shown generally at X, have been placed on a truck, the latter is pushed by hand, or otherwise, along the lower trackway toward the elevating platform 11, the latter having previously been positioned with its track in alinement with the lower trackway. The loaded truck is pushed onto the awaiting platform, whereupon the latch 245 is actuated to prevent further travel of trucks from the trackway toward said platform, and the latch 236 moves into upper position to lock or hold the truck on the platform from displacement from the latter.

After the truck is in proper position on the platform, the top-plate is lowered into position on the mold, and is clamped thereon by the clamping means heretofore described, and shown in Figs. 10, 35 and 36, whereupon the mold is poured, and, if desired, the power cylinder 194 operated, after release of the clamp, to lift the top-board from the mold. The lever 74 is then thrown downward from the position shown in Fig. 14 to the position shown in Fig. 15, which serves to operate the valve 48 to supply motive agent to the hoisting cylinder 31 at that end of the machine. The admission of the motive agent to the cylinder drives the piston downward, thereby taking up the cable 41 and elevating the platform, which operation normally continues until the top member of the platform structure strikes the stops 31ª, whereupon the platform is brought to rest with its tracks in alinement with the upper trackway 10. As soon as the platform moves away from the lower trackway, the lug 231 moves out of engagement with part 230, whereby latch 229 is moved by the weight 232 into position to prevent discharge of a truck from the trackway so long as the platform 11 is out of alinement therewith.

When the platform reaches the limit of its upward travel, the releasing device 238 strikes the lug 239 and the latch 236 is moved downward to leave the truck free to be moved from the platform onto the receiving end of the upper trackway. The platform having reached the upper limit of its travel, the valve 48 is permitted to remain in the position to which it has been moved so that the pressure continues to be exerted in the cylinder 31 to hold the platform in truck-discharging relation to the receiving end of the upper trackway. This operation having been completed, the parts of the interlock between the elevating controller and the controller for the truck-moving cross-head are in the position shown in Fig. 19, permitting operation of the last-named controller. The operator then swings the hand-lever 108 from the position shown in Fig. 14 to that shown in Fig. 15 which serves to operate the valve 93 to connect the source of fluid pressure to the rear end of the cylinder 75, thereby operating the piston in said cylinder to force the carriage or cross-head 80 outward toward the platform 11 until the latch 84 rides under and catches behind the lug 178 on the truck which is on the platform 11. During this operation of advancing the cross-head the control valve is in position so that port 91 is connected to the turn-plug port 99 to supply port 94, and the forward end of the cylinder 75 is connected through port 92 and port 99 with the exhaust 96. The cross-head having been latched to the truck, the operator then returns lever 108 to the position shown in Fig. 14, thereby operating the valve to admit fluid pressure from supply port 94, port 99ª and port 92 to the forward end of the cylinder, and to connect the rear end of the cylinder through ports 91 and 99ª to the exhaust 96, whereupon the cross-head is drawn inward toward the position shown in Figs. 1 to 4 and 14, and pulling the truck from the platform onto the upper trackway. When the truck passes onto the upper trackway, it engages any truck previously transferred to said trackway and pushes it toward the discharge end of the trackway. If more than one truck is already on the upper trackway, the whole series will be pushed toward the discharge end of the trackway.

It will be noted that previous to operation of lever 74 to its lower position, as shown in Fig. 15, the arcuate surface 115 will be within the re-entrant face 116, so that the shaft 103 cannot be rotated to cause operation of the cross-head controlling valve, but as soon as lever 74 has been swung to the position shown in Fig. 15, face 115 will be moved out of recess 116, and the re-entrant recess 117 will be brought into position permitting rotation of the segment 109 and its shaft 103, as shown in Fig. 19. It will also be seen that as soon as segment 113 has been moved to the position shown in Fig. 19, and shaft 103 has been operated to cause advance movement of cross-head 80, the weight 142 will cause the latch 123 to engage stop 122 of the segment 113 so that shaft 64 cannot be operated to cause the elevator to descend so long as the cross-head is functioning to engage a truck and draw it onto the upper trackway. When, however, the cross-head returns to initial position it strikes lever 140 and withdraws latch 123 from locking relation to segment 113, and the shaft 64 may then be operated to cause valve 48 to exhaust fluid pressure from cylinder 31 and permit the platform to descend to position to receive another truck from the lower trackway.

The truck or trucks transferred to the upper trackway pass along the same, as above described, toward the discharge end of the trackway, at which end they are transferred to the lowering platform by which the truck is placed in position to be returned to the lower trackway and the mold-receiving point, all of which is accomplished as follows: The operator, by the manual control mechanism at the shake-out end of the machine, operates valve 45 to cause fluid pressure to enter the upper end of cylinder 31, which causes the piston therein to descend and take up cable 41ª, thereby lifting the lowering platform to a position opposite the discharge end of the upper trackway. When said platform reaches its truck-receiving position, the arm or lug 265 strikes the lever 259 and lowers latch-bar 253 to permit passage of a truck along the upper trackway onto the platform. Assuming that the cross-head 144 is in the position shown in dotted lines in Fig. 20, the operator moves the hand-wheel 167 in a clockwise direction, which will cause drum 164 to take up on the forward lead of the cable 160 and pay out the rearward lead, thereby moving the cross-head 144 toward the discharge end of the trackway. When the cross-head is moved as just described, the face 156 on bar 154 will engage the lug 184 on a truck, and the latter will be moved along the upper trackway and onto the track on the lowering platform. As soon as the truck is in proper position on the trackway, latch bar 267 will automatically move into position behind the truck axle to hold the truck against displacement. The operator then operates hand-wheel 167 to return the cross-head to the position shown in dotted lines in Fig. 20. The operator then reverses the position of valve 45 which will relieve the pressure in cylinder 31ª and permit the platform carrying the truck to descend by gravity to a point in line with the receiving end of the lower trackway. The descent of the platform releases the lever 259 to permit the stop 253 to assume its position, preventing travel of the remaining trucks from the upper trackway until the platform is again returned into alinement with the upper trackway.

When the platform comes to rest in its lower position with its track in alinement with the receiving end of the lower trackway, the mold may be removed from the truck and the shake-out operation performed in order to recover the casting formed in the mold. Upon the platform reaching its lowermost position, the foot 271 of the latch 267 strikes the ground or any other suitable obstruction, whereby the engaging end 270 of said latch is moved out of holding relation to the truck, and the latter may then be pushed or otherwise propelled onto the lower trackway.

By the above construction, we are enabled to produce a machine having many advantages over machines and apparatus hitherto existing. Among the many advantages are the following:

The machine occupies a relatively small ground area, and may be conveniently and efficiently used in a building having small head room or low ceiling height, and at the same time be capable of large mold-carrying capacity, which is necessary in order to obtain sufficient period of time between the pouring and shaking out operations, so that the castings in the molds will be sufficiently cooled for shaking out. This assures that the castings will be in condition permitting easy and proper handling by the workmen without subjecting such workmen to intense or injurious heat. For example, a machine occupying a ground area of approximately fifty by six feet, and being approximately fourteen feet high, will have sufficient mold-carrying capacity so that molds measuring four feet by five feet by eight inches deep, when decked two high on the mold-carrying trucks, can be operated at a production rate of twenty-four molds per hour, and molds when produced at this rate will have approximately one-half hour for cooling from the time they are poured until they are shaken out.

By using the upper trackway for poured molds, the hot gases and steam passing off the poured molds are dissipated in the air above the heads of the workmen, thus enabling us, without any mechanical ventilation, to assure a healthful working zone for the workmen.

The construction as above described has the further advantage that the molds may be transferred through the cycle with a minimum of jar or vibration, thus preventing high loss of castings and assuring a high output of satisfactory product.

What we claim and desire to secure by Letters Patent of the United States is:—

1. A molding machine comprising upper and lower trackways adapted to have mold-carrying trucks travel thereon, a vertically movable platform for receiving and transferring trucks from one end of the lower trackway to the corresponding end of the upper trackway, a vertically movable platform for transferring trucks from the opposite end of the upper trackway to the corresponding end of the lower trackway, and means on one of said trackways adapted to engage a truck on one of said platforms to move said truck from said platform to said one trackway and along the latter.

2. A molding machine comprising upper and lower trackways adapted to have mold-carrying trucks travel thereon, a vertically movable platform for receiving and transferring trucks from one end of the lower trackway to the corresponding end of the upper trackway, means on one of said trackways adapted to engage a truck on said platform to move said truck from said platform to said one trackway and along the latter, and a vertically movable platform for transferring trucks from the opposite end of the upper trackway to the corresponding end of the lower trackway.

3. A molding machine comprising upper and lower trackways adapted to have mold-carrying trucks travel thereon, a vertically movable platform for receiving and transferring trucks from one end of the lower trackway to the corresponding end of the upper trackway, means on said upper trackway for moving trucks from said platform and along said upper trackway, and a vertically movable platform for transferring trucks from the opposite end of the upper trackway to the corresponding end of the lower trackway.

4. A molding machine comprising upper and lower trackways adapted to have mold-carrying trucks travel thereon, a vertically movable platform for receiving and transferring trucks from one end of the lower trackway to the corresponding end of the upper trackway, a vertically movable platform for transferring trucks from the opposite end of the upper trackway to the corresponding end of the lower trackway, means on the upper trackway for moving said trucks along the upper trackway toward said last-named platform, and means on the upper trackway for transferring the trucks from the upper trackway to said last-named platform.

5. A molding machine comprising upper and lower trackways adapted to have mold-carrying trucks travel thereon, a platform for receiving trucks from one trackway and transferring them to the other trackway, means on the platform whereby presence of a truck thereon prevents travel of the trucks on a trackway toward the platform, means for preventing travel of the trucks from the platform when the platform is out of truck-delivering relation to a trackway, and means preventing travel of trucks from a trackway when the platform is out of truck-receiving relation thereto.

6. A molding machine comprising upper and lower trackways adapted to have mold-carrying trucks travel thereon, a platform for receiving trucks from one trackway and transferring them to the other trackway, means on the platform whereby presence of a truck thereon prevents travel of the trucks on a trackway toward the platform, means on the platform for preventing travel of the trucks from the platform when the platform is out of truck-delivering relation to a trackway, and means preventing travel of trucks from a trackway when the platform is out of truck-receiving relation thereto.

7. A molding machine comprising upper and lower trackways adapted to have mold-carrying trucks travel thereon, a platform for receiving trucks from one trackway and transferring them to the other trackway, truck-engaging means actuated by gravity for preventing travel of the trucks from the platform when the latter is out of truck-delivering relation to a trackway, and means whereby said first-named means is automatically released from truck engagement when the platform reaches truck-delivering position.

8. A molding machine comprising upper and lower trackways adapted to have mold-carrying trucks travel thereon, a platform for receiving trucks from one trackway and transferring them to the other trackway, a truck-engaging latch actuated by gravity for preventing travel of the trucks from the platform when the latter is out of truck-delivering relation to a trackway, and means whereby said latch is automatically released from truck engagement when the platform reaches truck-delivering position.

9. A molding machine comprising upper and lower trackways adapted to have mold-carrying trucks travel thereon, a platform for receiving trucks from one trackway and transferring them to the other trackway, and means on said platform whereby the presence of a truck thereon prevents travel of trucks on a trackway toward the platform.

10. A molding machine comprising a plurality of trackways adapted to have trucks travel thereon, transfer means for transferring trucks from one trackway to another, truck-moving means mounted on said other trackway for pulling a truck from said transfer means to said other trackway, and means preventing operation of said transfer means during operation of said truck-moving means.

11. A molding machine comprising a plurality of trackways adapted to have trucks travel thereon, transfer means for transferring trucks from one trackway to another, a controller for said transfer means, truck-moving means for moving a truck from said transfer means to a trackway, and means preventing operation of said controller during operation of said truck-moving means.

12. A molding machine comprising a plurality of trackways adapted to have trucks travel thereon, transfer means for transferring trucks from one trackway to another, a controller for said transfer means, truck-moving means for moving a truck from said transfer means to a trackway, a controller for said truck-moving means, and means whereby the operation of said last-named controller prevents operation of the controller for said transfer means.

13. A molding machine comprising a plurality of trackways adapted to have trucks travel thereon, transfer means for transferring trucks from one trackway to another, a controller for said transfer means, truck-moving means for moving a truck from said transfer means to a trackway, a controller for said truck-moving means, and means whereby the operation of one controller is controlled by the operation of the other controller.

14. A molding machine comprising upper and lower horizontal trackways, a platform for elevating trucks from the lower trackway to the upper trackway, means for raising and lowering said platform, and means for preventing operation of said platform raising and lowering means while a truck is being discharged onto the upper trackway.

15. A molding machine comprising upper and lower horizontal trackways, a platform for elevating trucks from the lower trackway to the upper trackway, means for raising and lowering said platform, and means for preventing lowering operation of said platform raising and lowering means while a truck is being discharged onto the upper trackway.

16. A molding machine comprising upper and lower trackways, a vertically movable platform for raising trucks from the lower trackway to the upper trackway, means for raising and lowering said platform, a controller for said means, truck-moving means for moving trucks from said platform to said upper trackway when the platform is in truck discharging relation thereto, a controller for said truck-moving means, and means preventing operation of said last-named controller except when said platform is in discharging relation to said upper trackway.

17. A molding machine comprising upper and lower trackways, a vertically movable platform for raising trucks from the lower trackway to the upper trackway, means for raising and lowering said platform, a controller for said means, truck-moving means for moving trucks from said platform to said upper trackway when the platform is in truck-discharging relation thereto, a controller for said truck-moving means, and means preventing operation of said last-named controller except when said platform is in discharging relation to said upper trackway, and preventing operation of the first-named controller during operation of said truck-moving means.

18. A molding machine comprising upper and lower trackways, a vertically movable platform for raising trucks from the lower trackway to the upper trackway, means for raising and lowering said platform, a controller for said means, truck-moving means for moving trucks from said platform to said upper trackway when the platform is in truck-discharging relation thereto, a controller for said truck-moving means, and means preventing operation of said last-named controller except when said platform is in discharging relation to said upper trackway and preventing operation of the first-named controller while the platform is in discharging relation to the upper trackway and said truck-moving means is being operated.

19. A molding machine comprising upper and lower trackways, a vertically movable platform for raising trucks from the lower trackway to the upper trackway, fluid pressure means for raising and lowering said platform, a valve controlling said means, and means preventing operation of said valve while a truck is being moved from said platform to said upper trackway.

20. A molding machine comprising upper and lower trackways, a vertically movable platform for raising trucks from the lower trackway to the upper trackway, fluid pressure means for raising and lowering said platform, a valve controlling said means, manually operable means for operating said valve, and means preventing operation of said manually operable means while a truck is being moved from said platform to said upper trackway.

21. A molding machine comprising a plurality of trackways, transfer means for transferring trucks from one trackway to another, reciprocable truck-moving means for moving a truck from said transfer means to a trackway, and means for automatically preventing operation of said transfer means during reciprocation of said truck-moving means.

22. A molding machine comprising a plurality of trackways, transfer means for transferring trucks from one trackway to another, means for moving the transfer means, a controller for said moving means, truck-moving means for moving a truck from said transfer means to a trackway, a latch cooperable with said controller to prevent operation thereof, and means for automatically engaging the latch with the controller during operation of said truck-moving means.

23. A molding machine comprising a plurality of trackways, transfer means for transferring trucks from one trackway to another, means for moving said transfer means, a controller for said moving means, truck-moving means for moving a truck from said transfer means to a trackway, a pivoted latch cooperable with said controller to prevent operation thereof, and a member for operating said latch and cooperable with said moving means whereby the latch is engaged and disengaged with said controller.

24. A molding machine comprising a plurality of trackways, transfer means for transferring trucks from one trackway to another, means for moving said transfer means, a controller for said moving means, truck-moving means for moving a truck from said transfer means to a trackway, a pivoted latch cooperable with said controller to prevent operation thereof, a weight tending to engage said latch with said controller, and a member movable to release said latch and arranged to be engaged by said moving means to release said latch.

25. A molding machine comprising upper and lower trackways adapted to have mold-carrying trucks travel thereon, vertical frame structures at the opposite ends of said trackways, and a vertically movable platform mounted slidably on and supported by each of said frame structures and having tracks adapted to aline with said upper and lower trackways whereby said platforms are adapted to receive and transfer trucks from one trackway to another.

26. A molding machine comprising upper and lower trackways adapted to have mold-carrying trucks travel thereon, vertical frame structures at the opposite ends of said trackways, a vertically movable platform mounted slidably on each of said frame structures and having tracks adapted to aline with said upper and lower trackways, means on one of said trackways to move trucks from one of said platforms onto said trackway, and means on said one trackway to move trucks therefrom onto the other of said platforms.

27. A molding machine comprising upper and lower trackways adapted to have mold-carrying trucks travel thereon, vertical frame structures at the opposite ends of said trackways, a vertically movable platform mounted slidably on each of said frame structures and having tracks adapted to aline with said upper and lower trackways, means on one of said trackways to move trucks from one of said platforms onto said trackway, and means on said one trackway to move trucks therefrom onto the other of said platforms, said truck-moving means being operable independently of each other.

28. A molding machine comprising upper and lower trackways adapted to have trucks travel thereon, a vertically movable platform to receive a truck from one trackway and transfer the same to the other trackway, a carriage associated with said other trackway, means to reciprocate the carriage toward and away from said platform, and means for detachably connecting said carriage to a truck whereby the latter may be moved from the platform onto said other trackway.

29. A molding machine comprising upper and lower trackways adapted to have trucks travel thereon, a vertically movable platform to receive a truck from one trackway and transfer the same to the other trackway, a carriage associated with said other trackway, means to reciprocate the carriage toward and away from said platform, and means mounted on said carriage for detachably connecting said carriage to a truck whereby the latter may be moved from the platform onto said other trackway.

30. A molding machine comprising upper and lower trackways adapted to have trucks travel thereon, a vertically movable platform to receive a truck from one trackway and transfer the same to the other trackway, a carriage associated with said other trackway, means to reciprocate the carriage toward and away from said platform, and a spring-operated latch mounted on said carriage for detachably connecting said carriage to a truck whereby the latter may be moved from the platform onto said other trackway.

31. A molding machine comprising upper and lower trackways adapted to have trucks travel thereon, a vertically movable platform to receive a truck from one trackway and transfer the same to the other trackway, a guide extending lengthwise of said other trackway, a carriage adapted to travel on said guide, means to reciprocate the said carriage toward and away from said platform, and means for detachably connecting said carriage to a truck whereby the latter may be moved from the platform onto said other trackway.

32. A molding machine comprising upper and lower trackways adapted to have trucks travel thereon, a vertically movable platform to receive a truck from one trackway and transfer the same to the other trackway, a reciprocating carriage on said one trackway, means for reciprocating the carriage toward and away from the platform, a frame pivoted on the carriage, and an engaging element on said frame and adapted to engage a truck to move the same from said one trackway onto said platform.

33. A molding machine comprising upper and lower trackways adapted to have trucks travel thereon, a vertically movable platform to receive a truck from one trackway and transfer the same to the other trackway, a reciprocating carriage on said one trackway, means for reciprocating the carriage toward and away from the platform, a frame pivoted on the carriage, and an engaging element pivotally mounted on said frame and adapted to engage a truck to move the same from said one trackway onto said platform.

34. A molding machine comprising upper and lower trackways, a vertically movable platform for raising trucks from the lower trackway to the upper trackway, means for raising and lowering said platform, a controller for said means, truck-moving means for moving trucks from said platform to said upper trackway when said platform is in truck-discharging relation thereto, a controller for said truck-moving means, and interlocking means between said controllers preventing operation of said last-named controller except when said platform is in discharging relation to said upper trackway.

35. A molding machine comprising upper and lower trackways, a vertically movable platform for raising trucks from the lower trackway to the upper trackway, means for raising and lowering said platform, a controller for said means, truck-moving means for moving trucks from said platform to said upper trackway when said platform is in truck-discharging relation thereto, a controller for said truck-moving means, interlocking means between said controllers preventing operation of said last-named controller except when said platform is in discharging relation to said upper trackway, and means for locking said first-named controller during operation of said last-named controller.

36. A molding machine comprising upper and lower trackways, a vertically movable platform for raising trucks from the lower trackway to the upper trackway, means for raising and lowering said platform, a controller for said means, truck-moving means for moving trucks from said platform to said upper trackway when said platform is in truck-discharging relation thereto, a controller for said truck-moving means, interlocking means between said controllers preventing operation of said last-named controller except when said platform is in discharging relation to said upper trackway, and means for locking said first-named controller during operation of said last-named controller, said locking means being releasable at completion of operation of said truck-moving means.

37. A molding machine comprising a substantially rectangular framework including upper and lower horizontal members, and vertical end members, said horizontal members of said framework bearing longitudinal trackways, said vertical end members including guide means, platforms at the opposite ends of said frame and bearing trackways adapted to aline with the trackways on the horizontal members, hanger members fixed to one side of each platform, and means on said hanger members holding said platforms laterally to said guide means on said end members and permitting vertical movement of said platforms on said end members.

38. A molding machine having vertically spaced trackways adapted to have mold-carrying trucks travel thereon, end members supporting said trackways, platforms in lateral engagement with said end members and vertically reciprocable thereon between said trackways, said trackways and platforms forming a substantially continuous circuit whereby a cycle of operations may be performed with respect to said trucks as said trucks complete a circuit of said trackways.

39. A molding machine comprising spaced upper and lower trackways adapted to have mold-carrying trucks travel thereon, columns supporting said upper trackway at the ends thereof and arranged on opposite sides of said lower trackway at the ends thereof, a platform at each end of said trackway and abutting said columns, tracks on said platforms adapted to be alined with said trackways, and means on each said platform to hold the same in fixed angular and lateral relation to said columns but permitting vertical slidable engagement therewith whereby said platforms and said trackways form a substantially continuous circuit permitting the completion of a cycle of operations on said machine.

In witness whereof, we have hereunto subscribed our names.

RILEY L. REDPATH.
SHERWOOD C. BLISS